(12) United States Patent
Echigo et al.

(10) Patent No.: US 12,492,945 B2
(45) Date of Patent: Dec. 9, 2025

(54) TEMPERATURE DISTRIBUTION LEARNING APPARATUS

(71) Applicant: DAIKIN INDUSTRIES, LTD., Osaka (JP)

(72) Inventors: Tomio Echigo, Suita (JP); Seiichi Tagawa, Suita (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 446 days.

(21) Appl. No.: 18/012,821

(22) PCT Filed: Jun. 30, 2021

(86) PCT No.: PCT/JP2021/024712
§ 371 (c)(1),
(2) Date: Dec. 23, 2022

(87) PCT Pub. No.: WO2022/004777
PCT Pub. Date: Jan. 6, 2022

(65) Prior Publication Data
US 2023/0258503 A1 Aug. 17, 2023

(30) Foreign Application Priority Data

Jun. 30, 2020 (JP) .................................. 2020-112634
May 14, 2021 (JP) .................................. 2021-082694

(51) Int. Cl.
*G01J 5/80* (2022.01)
*G01J 5/00* (2022.01)
(Continued)

(52) U.S. Cl.
CPC .............. *G01J 5/80* (2022.01); *G01J 5/0003* (2013.01); *G01J 5/485* (2022.01); *G06V 10/70* (2022.01)

(58) Field of Classification Search
CPC .. G01J 5/026; G01J 5/80; G01J 5/0003; G01J 5/0066; G01J 5/485; G06V 10/70;
(Continued)

(56) References Cited

U.S. PATENT DOCUMENTS

2014/0334519 A1 11/2014 Antonini et al.
2018/0038609 A1 2/2018 Kuroiwa

FOREIGN PATENT DOCUMENTS

JP 2008-241433 A 10/2008
JP 2009-257617 A 11/2009
(Continued)

OTHER PUBLICATIONS

International Preliminary Report of corresponding PCT Application No. PCT/JP2021/024712 dated Jan. 12, 202.
(Continued)

*Primary Examiner* — An H Do
(74) *Attorney, Agent, or Firm* — GLOBAL IP COUNSELORS, LLP

(57) ABSTRACT

A temperature distribution learning apparatus learns a temperature distribution including a temperature at least a first point in air of a target space. The temperature distribution learning apparatus includes a learning model. The learning model learns the temperature distribution, which is an objective variable, and a thermal image, which is an explanatory variable and is related to the target space, in association with each other. The learning model learns based training data including the temperature distribution and the thermal image.

14 Claims, 16 Drawing Sheets

(51) Int. Cl.
*G01J 5/48* (2022.01)
*G06V 10/70* (2022.01)

(58) Field of Classification Search
CPC ............... G01K 7/427; G01K 2213/00; G01K 2201/00; G06N 3/09
See application file for complete search history.

(56) References Cited

FOREIGN PATENT DOCUMENTS

| | | |
|---|---|---|
| JP | 2019-95323 A | 6/2019 |
| WO | 2020/075244 A1 | 4/2020 |

OTHER PUBLICATIONS

European Search Report of corresponding EP Application No. 21 832 921.7 dated Jun. 5, 2024.
International Search Report of corresponding PCT Application No. PCT/JP2021/024712 dated Sep. 28, 2021.

TEMPERATURE DISTRIBUTION LEARNING APPARATUS

CROSS-REFERENCE TO RELATED APPLICATIONS

This U.S. National stage application claims priority under 35 U.S.C. § 119 (a) to Japanese Patent Applications No. 2020-112634, filed in Japan on Jun. 30, 2020, and 2021-082694, filed in Japan on May 14, 2021. the entire contents of which are hereby incorporated herein by reference.

BACKGROUND

Technical Field

The present disclosure relates to a temperature distribution learning apparatus.

Background Art

As disclosed in WO 2020-075244, there is a technique of learning the temperature distribution of a target space using thermal images of the target space and information on a blowing outlet of an air conditioner.

SUMMARY

In WO 2020-075244, there is a problem that if there is no air conditioner in a target space, information on a blowing outlet of the air conditioner is not obtained, and the temperature distribution of the target space cannot be learned.

A temperature distribution learning apparatus of a first aspect learns a temperature distribution including a temperature at least a first point in air of a target space. The temperature distribution learning apparatus includes a learning model. The learning model learns a temperature distribution, which is an objective variable, and a thermal image, which is an explanatory variable and is related to the target space, in association with each other. The learning model learns on the basis of training data including the temperature distribution and the thermal image.

In the temperature distribution learning apparatus of the first aspect, the learning model learns the temperature distribution, which is an objective variable, and the thermal image, which is an explanatory variable and is related to the target space, in association with each other. As a result, the temperature distribution learning apparatus can learn the temperature distribution of the target space even if there is no air conditioner in the target space. Note that even in a case where there is an air conditioner in the target space, the temperature distribution learning apparatus can learn the temperature distribution of the target space without using information related to the air conditioner or using information related to the air conditioner in combination.

A temperature distribution learning apparatus of a second aspect is the temperature distribution learning apparatus of the first aspect, in which the temperature distribution is temperatures at a plurality of points in the air of the target space.

For the temperature distribution learning apparatus of the second aspect, the temperature distribution is the temperatures at a plurality of points in the air of the target space. As a result, the temperature distribution learning apparatus can learn, from the thermal image related to the target space, a learning model for estimating temperatures at a plurality of points in the air of the target space.

A temperature distribution estimation apparatus of a third aspect includes a temperature distribution estimation unit and an acquisition unit. The temperature distribution estimation unit estimates the temperature distribution from the thermal image using the learning model of the temperature distribution learning apparatus of the first or second aspect. The acquisition unit acquires the thermal image.

In the temperature distribution estimation apparatus of the third aspect, the temperature distribution estimation unit estimates the temperature distribution from the thermal image using the learning model of the temperature distribution learning apparatus. The acquisition unit acquires the thermal image. As a result, the temperature distribution estimation apparatus can estimate the temperature distribution from the thermal image without a temperature sensor. The estimated temperature distribution is used, for example, as determination material for controlling an air conditioner.

A temperature distribution estimation apparatus of a fourth aspect is the temperature distribution estimation apparatus of the third aspect, in which the temperature distribution estimation unit further estimates, on the basis of the estimated temperature distribution, a temperature in the air of the target space that is not included in the estimated temperature distribution.

With such a configuration, the temperature distribution estimation apparatus of the fourth aspect can estimate the temperature in any air of the target space.

A temperature distribution estimation apparatus of a fifth aspect is the temperature distribution estimation apparatus of the fourth aspect, and further includes a heat source position identification unit, a heat source influence estimation unit, and a heat-source-influence-reflecting unit. The heat source position identification unit identifies the position of a heat source in the target space. The heat source influence estimation unit estimates a temperature variation around the heat source due to the influence of the heat source. The heat-source-influence-reflecting unit reflects the temperature variation around the heat source estimated by the heat source influence estimation unit, to the temperature in the air of the target space estimated by the temperature distribution estimation unit.

In the temperature distribution estimation apparatus of the fifth aspect, the heat source position identification unit identifies the position of a heat source in the target space. The heat source influence estimation unit estimates a temperature variation around the heat source due to the influence of the heat source. The heat-source-influence-reflecting unit reflects the temperature variation around the heat source estimated by the heat source influence estimation unit, to the temperature in the air of the target space estimated by the temperature distribution estimation unit. As a result, the temperature distribution estimation apparatus can estimate the temperatures in the air of the target space to which the influence of the heat source is reflected.

A temperature distribution estimation apparatus of a sixth aspect is the temperature distribution estimation apparatus of the fifth aspect, in which the heat source position identification unit identifies the position of the heat source with a camera or a depth sensor.

In the temperature distribution estimation apparatus of the sixth aspect, the heat source position identification unit identifies the position of the heat source with the camera or the depth sensor. As a result, the temperature distribution estimation apparatus can identify the position of the heat source using the camera or the depth sensor.

A temperature distribution estimation apparatus of a seventh aspect is the temperature distribution estimation apparatus of the fifth or sixth aspect, in which the heat source position identification unit identifies the position of a person as the position of the heat source.

In the temperature distribution estimation apparatus of the seventh aspect, the heat source position identification unit identifies the position of a person as the position of the heat source. As a result, the temperature distribution estimation apparatus can estimate the temperature in the air of the target space to which the influence of the person is reflected.

A temperature distribution learning method of an eighth aspect learns a temperature distribution including a temperature at least a first point in air of a target space. The temperature distribution learning method includes a learning step. The learning step learns the temperature distribution, which is an objective variable, and a thermal image, which is an explanatory variable and is related to the target space, in association with each other. The learning step learns on the basis of training data including the temperature distribution and the thermal image. As a result, the temperature distribution learning method can be executed in any apparatus.

A temperature distribution estimation method of a ninth aspect includes a temperature distribution estimation step and an acquisition step. The temperature distribution estimation step estimates the temperature distribution from the thermal image by the temperature distribution learning method of the eighth aspect. The acquisition step acquires the thermal image. As a result, the temperature distribution estimation method can be executed in any apparatus.

A temperature distribution estimation method of a tenth aspect is the temperature distribution estimation method of the ninth aspect, in which the temperature distribution estimation step further estimates, on the basis of the estimated temperature distribution, a temperature in the air of the target space that is not included in the estimated temperature distribution. As a result, the temperature distribution estimation method can be executed in any apparatus.

A temperature distribution estimation method of an eleventh aspect is the temperature distribution estimation method of the tenth aspect, and further includes a heat source position identification step, a heat source influence estimation step, and a heat-source-influence-reflecting step. The heat source position identification step identifies the position of a heat source in the target space. The heat source influence estimation step estimates a temperature variation around the heat source due to the influence of the heat source. The heat-source-influence-reflecting step reflects the temperature variation around the heat source estimated by the heat source influence estimation step, to the temperature in the air of the target space estimated in the temperature distribution estimation step. As a result, the temperature distribution estimation method can be executed in any apparatus.

BRIEF DESCRIPTION OF THE DRAWINGS

FIG. 11 is a diagram showing an example of a temperature map.

FIG. 12 is a diagram showing an example of a grid plane in a process of creating a temperature map.

DETAILED DESCRIPTION OF EMBODIMENT(S)

(1) Overall Configuration

Figure 1:
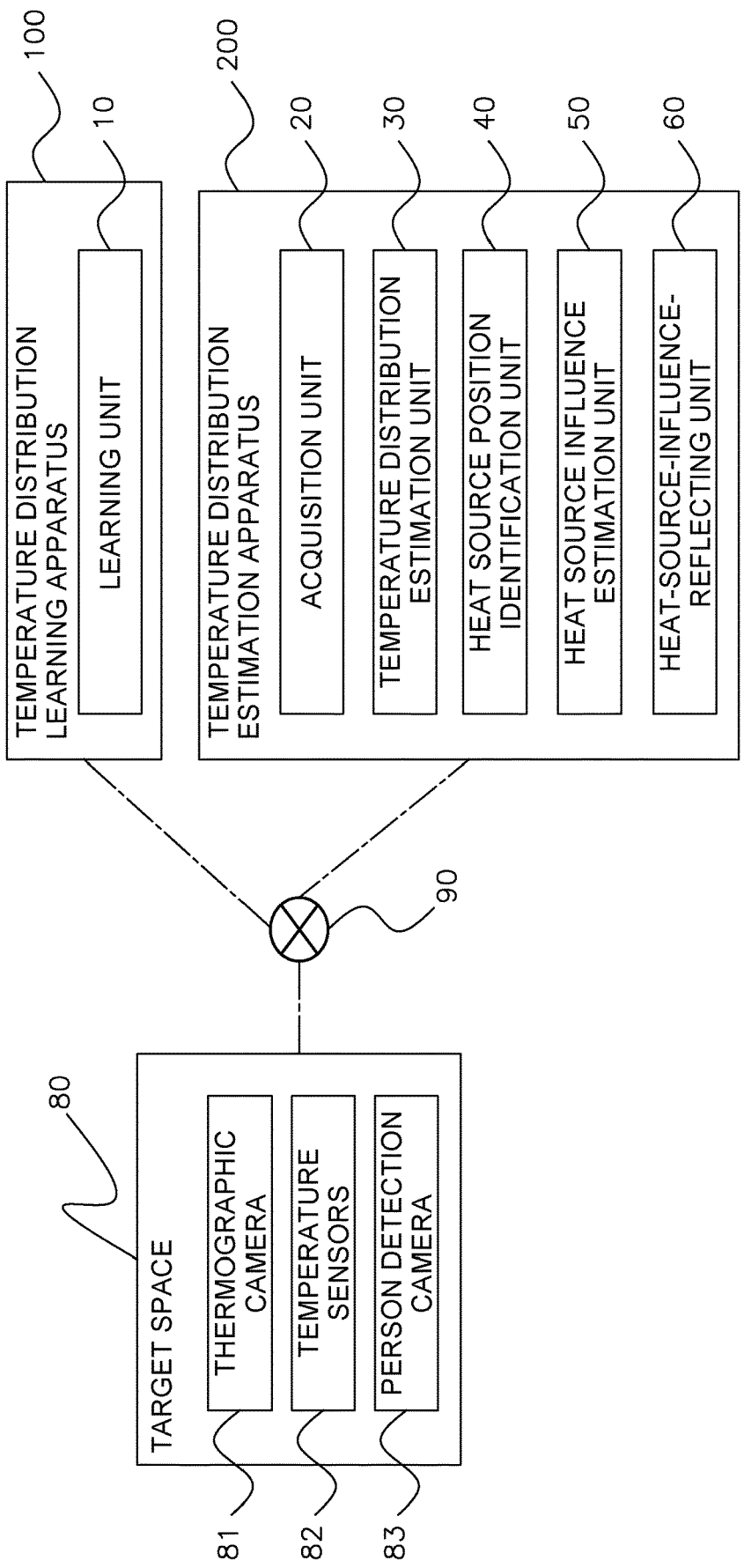
FIG. 1 is a configuration diagram of a temperature distribution learning apparatus and a temperature distribution estimation apparatus.

FIG. 1 is a configuration diagram of a temperature distribution learning apparatus 100 and a temperature distribution estimation apparatus 200. As shown in FIG. 1, the temperature distribution learning apparatus 100, the temperature distribution estimation apparatus 200, and each equipment 81 to 83 in a target space 80 are communicably connected to each other via a network 90. In the present embodiment, the network 90 is the Internet. However, the network 90 is not limited to the Internet as long as the temperature distribution learning apparatus 100, the temperature distribution estimation apparatus 200, and each equipment 81 to 83 in the target space 80 are communicably connected to each other. For example, in a case where the temperature distribution learning apparatus 100 and the temperature distribution estimation apparatus 200 are installed in the same building as the target space 80, the network 90 may be a wired or wireless local area network (LAN) or the like. Alternatively, in a case where the temperature distribution learning apparatus 100 is incorporated in the temperature distribution estimation apparatus 200, the network 90 that connects the temperature distribution learning apparatus 100 to the temperature distribution estimation apparatus 200 may be an electronic circuit or the like.

(2) Detailed Configuration
(2-1) Target Space

The target space 80 is, for example, an office space. As shown in FIG. 1, a thermographic camera 81, temperature sensors 82, and a person detection camera 83 are installed in the target space 80.

Figure 4:
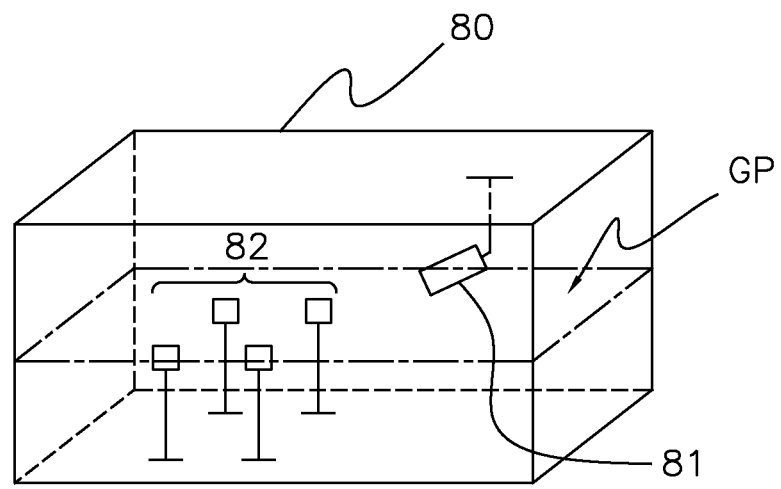
FIG. 4 is a diagram showing an example of a target space during the temperature distribution learning processing.
Figure 5:
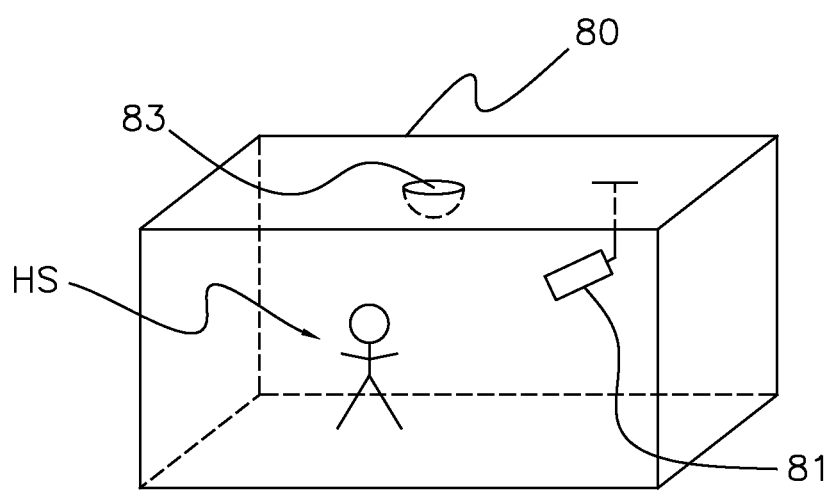
FIG. 5 is a diagram showing an example of the target space during the temperature distribution estimation processing.

FIG. 4 is a diagram showing an example of the target space 80 during temperature distribution learning processing. Further, FIG. 5 is a diagram showing an example of the target space 80 during temperature distribution estimation processing. The temperature distribution learning processing and the temperature distribution estimation processing will be described later.

As shown in FIGS. 4 and 5, the thermographic camera 81 is installed in such a manner that the thermographic camera 81 is suspended from the ceiling of the target space 80. The thermographic camera 81 captures a thermal image HI in which surface temperatures of a floor, walls, a window, furniture, and the like of the target space 80 are displayed in pseudo colors. The thermal image HI is a grayscale image. Each pixel of the thermal image HI stores, for example, an integer from 0 to 65535 related to a degree Celsius. This integer is, for example, ten times the real number value of a temperature to retain the numerical value of the temperature to the first decimal place. Hereinafter, a thermal image HI acquired by the temperature distribution learning apparatus 100 in the temperature distribution learning processing is referred to as a thermal image HI1. Further, a thermal image HI acquired by the temperature distribution estimation apparatus 200 in the temperature distribution estimation processing is referred to as a thermal image HI2.

Figure 6:
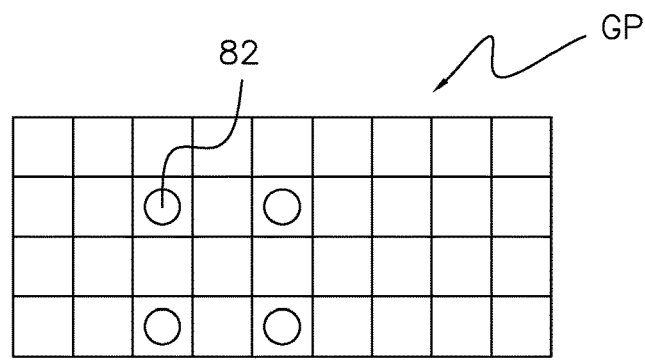
FIG. 6 is a diagram showing an example of a grid plane.

As shown in FIG. 4, the temperature sensors 82 are installed in the air of the target space 80. In the present embodiment, the plurality of temperature sensors 82 is installed at the same height. The height is, for example, 100 cm to 120 cm from the floor. In FIG. 4, the four temperature sensors 82 are installed by way of an example. The temperature sensors 82 measure the temperatures at the installed positions. Hereinafter, a set of temperatures measured by the plurality of temperature sensors 82 will be referred to as measured temperature values TM. For example, in a case where there are N temperature sensors 82, the measured temperature values TM are represented as an N-dimensional vector. Further, in the temperature distribution learning processing, measured temperature values TM acquired by the temperature distribution learning apparatus 100 are referred to as measured temperature values TM1. In the temperature distribution estimation processing, measured temperature values TM estimated by the temperature distribution estimation apparatus 200 are referred to as measured temperature values TM2. Further, as shown in FIG. 4, a plane at the same height as the height of the temperature sensors 82 divided by a two-dimensional grid is referred to as a grid plane GP. In FIG. 4, grid lines of the grid plane GP are omitted. In the present embodiment, the grid plane GP is configured such that in each cell divided by the grid lines, at most one of the temperature sensors 82 exists. FIG. 6 is a diagram showing an example of the grid plane GP. In FIG. 6, the temperature sensors 82 are indicated by circles. As shown in FIG. 6, each cell of the grid plane GP includes at most one of the temperature sensors 82.

As shown in FIG. 5, the person detection camera 83 is installed on the ceiling of the target space 80. The person detection camera 83 of the present embodiment is an omni-directional camera. The person detection camera 83 detects the position of a person in the target space 80, and outputs the coordinates as position data 831. In the present embodiment, the person detection camera 83 is used to detect the position of a person in the target space 80. However, for example, a depth sensor or light detection and ranging (LiDAR) may be used to detect the position of a person in the target space 80.

(2-2) Temperature Distribution Learning Apparatus

The temperature distribution learning apparatus 100 learns a temperature distribution TD including the temperature at least a first point in the air of the target space 80. In the present embodiment, the temperature distribution TD is the temperatures at representative points in the cells in which the temperature sensors 82 exist in the grid plane GP. The temperatures of the representative points during the learning are values measured by the corresponding temperature sensors 82. For example, temperatures calculated by simulation, or the like may be used as the temperatures at the representative points during the learning. Hereinafter, the cells in which the temperatures at the representative points are measured by the temperature sensors 82 may be referred to as "cells whose temperatures are defined". Further, the temperature at the representative point in the cell may be referred to as the "temperature in the cell". Therefore, the temperature distribution TD is a distribution of the temperatures of the cells whose temperatures are defined for the learning. Since in the present embodiment, the plurality of temperature sensors 82 exists, the temperature distribution TD learned by the temperature distribution learning apparatus 100 is the temperatures at the plurality of representative points in the air of the target space 80. In other words, the temperature distribution TD learned by the temperature distribution learning apparatus 100 is the temperature values TM1 measured by the plurality of temperature sensors 82.

Hereinafter, the processing in which the temperature distribution learning apparatus 100 creates a learning model LM to be described later is referred to as temperature distribution learning processing.

As shown in FIG. 1, the temperature distribution learning apparatus 100 mainly includes a learning unit 10.

The temperature distribution learning apparatus 100 includes a control arithmetic device and a storage device. A processor, such as a central processing unit (CPU) or a graphics processing unit (GPU), can be used as the control arithmetic device. The control arithmetic device reads programs stored in the storage device, and performs predetermined image processing and arithmetic processing in accordance with the programs. In addition, according to the programs, the control arithmetic device can write an arithmetic result into the storage device, and read information stored in the storage device. The learning unit 10 is various functional blocks implemented by the control arithmetic device.

(2-2-1) Learning Unit

The temperature distribution learning apparatus 100 includes a learning model LM. The learning unit 10 creates the learning model LM that learns the temperature distribution TD, which is an objective variable, and the thermal image HI1, which is an explanatory variable and is related to the target space 80, in association with each other. In other words, the learning unit 10 creates the learning model LM using the correspondence between the temperature distribution TD and the thermal image HI1, as training data.

Figure 2:
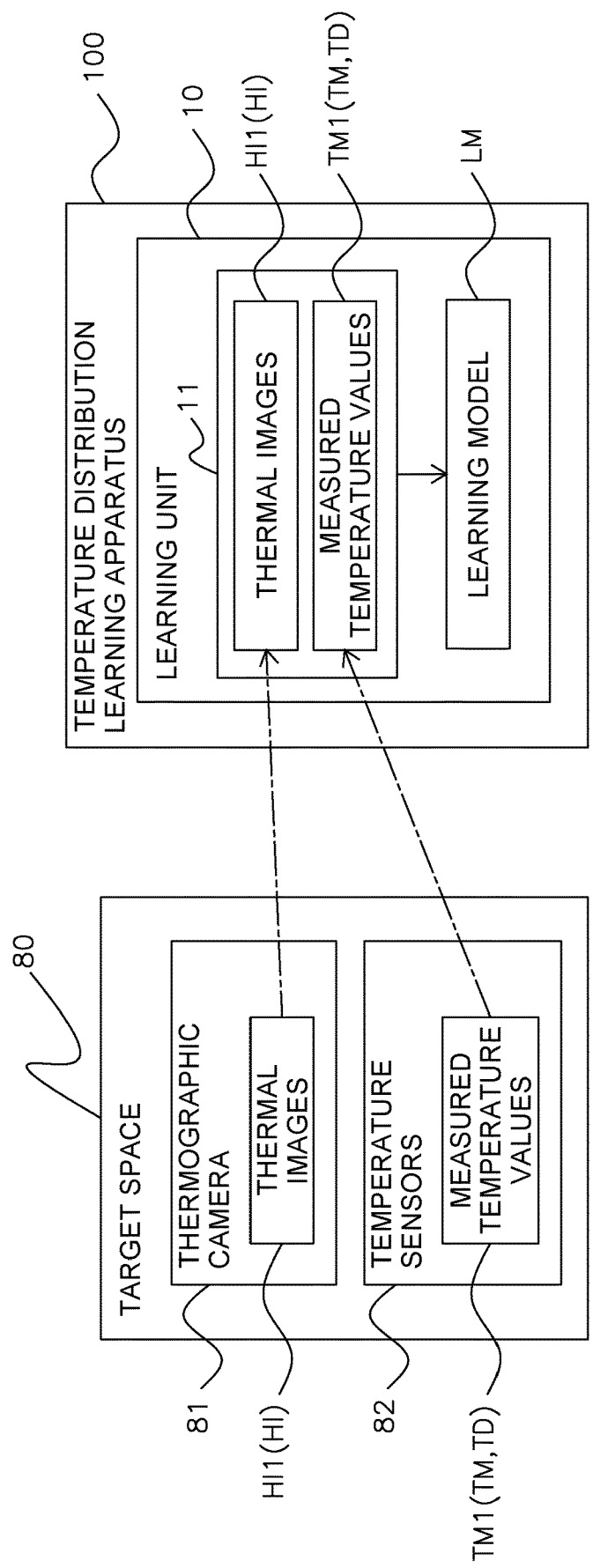
FIG. 2 is a configuration diagram of temperature distribution learning processing.

FIG. 2 is a configuration diagram of the temperature distribution learning processing. As shown in FIG. 2, the learning unit 10 acquires thermal images HI1 from the thermographic camera 81 shown in FIG. 4, as an explanatory variable of learning data 11. The thermal images HE are thermal images HI1 of the target space 80 at predetermined time intervals in a predetermined period. The predetermined period is, for example, one month. The predetermined time intervals are, for example, five-minute intervals. The learning unit 10 may acquire the thermal images HI1 at the predetermined time intervals in real time, or may collectively acquire the thermal images HI1 of the predetermined period.

Further, as shown in FIG. 2, the learning unit 10 acquires measured temperature values TM1 from the plurality of temperature sensors 82 shown in FIG. 4, as an objective variable of the learning data 11. The learning unit 10 acquires the measured temperature values TM1 at the same times as the acquired thermal images HI1.

In response to the acquisition of the learning data 11, the learning unit 10 creates a learning model LM, as shown in FIG. 2. In the present embodiment, the learning model LM is a normal neural network. However, the learning model LM is not limited to a normal neural network, and other learning models LM may be used.

(2-2-2) Verification

Here, the learning accuracy in a case where the learning model LM was a normal neural network was verified. In the present verification, 38 temperature sensors 82 were installed in a target space 80. Of learning data 11, training data is data from 0:00 on Apr. 1, 2020 to 24:00 on Apr. 30, 2020, at five-minute intervals. Test data is data from 0:00 on May 1, 2020 to 24:00 on May 12, 2020, at five-minute intervals.

Further, in the present verification, a three-layer neural network was used as the learning model LM. Thermal images HI1 having a resolution of 80×80, and transformed into 6400 dimensions were input into the input layer. Measured temperature values TM1, which were a 38-dimensional vector, were output into the output layer. The input layer, intermediate layer, and output layer are fully connected.

Figure 7:
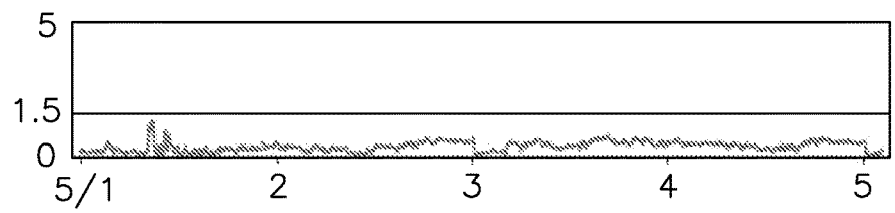
FIG. 7 is a diagram showing a verification result of learning accuracy.
Figure 8:
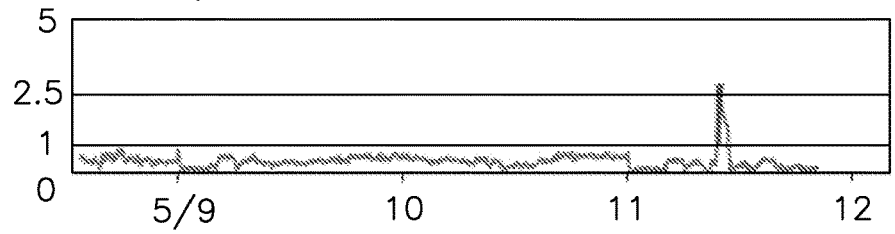
FIG. 8 is a diagram showing the verification result of the learning accuracy.

FIGS. 7 and 8 are diagrams showing a verification result of the learning accuracy. FIGS. 7 and 8 show a verification result for one of the temperature sensors 82. The vertical axis in FIGS. 7 and 8 is the absolute error between a predicted temperature and an actually measured temperature. The absolute error is the absolute value of the difference between a predicted temperature and an actually measured temperature. The horizontal axis in FIGS. 7 and 8 is a portion of the period of the test data. As shown in FIG. 7, the absolute error was at most 1.5° C. between May 1, 2020 and May 5, 2020. On the other hand, as shown in FIG. 8, although the absolute error was at most 1° C. as a whole between May 9, 2020 and May 12, 2020, the absolute error was partly about 2.5° C. around 12:00 on May 11, 2020.

(2-3) Temperature Distribution Estimation Apparatus

The temperature distribution estimation apparatus 200 estimates the temperature in the air of the target space 80 using the learning model LM and the like. In other words, the temperature distribution estimation apparatus 200 creates a temperature map HM of the target space 80. The temperature map HM is a map in which a temperature corresponding to each cell is input into each cell of the grid plane GP. Regarding each cell as a pixel allows the temperature map HM to be represented also as an image in which the level of the temperature in each cell is expressed by, for example, grayscale shading. Further, regarding each cell as a pixel allows the temperature map HM to be represented also as a pseudo-color display image in which the level of the temperature in each cell is expressed in red, yellow, and blue in order of high temperature. The temperature distribution estimation apparatus 200 outputs a temperature map HM4 as the temperature map HM over which the influence of a person in the target space 80 is reflected. Further, the temperature distribution estimation apparatus 200 outputs a temperature map HM1 as the temperature map HM over which the influence of a person in the target space 80 is not reflected. A case where the influence of a person in the target space 80 is to be reflected is a case where it is considered that a person stays at the same cell on the grid plane GP for a predetermined time.

Hereinafter, processing in which the temperature distribution estimation apparatus 200 outputs the temperature map HM is referred to as temperature distribution estimation processing.

As shown in FIG. 1, the temperature distribution estimation apparatus 200 mainly includes an acquisition unit 20, a temperature distribution estimation unit 30, a heat source position identification unit 40, a heat source influence estimation unit 50, and a heat-source-influence-reflecting unit 60.

The temperature distribution estimation apparatus 200 includes a control arithmetic device and a storage device. A processor, such as a CPU or GPU, can be used as the control arithmetic device. The control arithmetic device reads programs stored in the storage device, and performs predetermined image processing and arithmetic processing in accordance with the programs. In addition, according to the programs, the control arithmetic device can write an arithmetic result into the storage device, and read information stored in the storage device. The acquisition unit 20, the temperature distribution estimation unit 30, the heat source position identification unit 40, the heat source influence estimation unit 50, and the heat-source-influence-reflecting unit 60 are various functional blocks implemented by the control arithmetic device.

(2-3-1) Acquisition Unit

Figure 3:
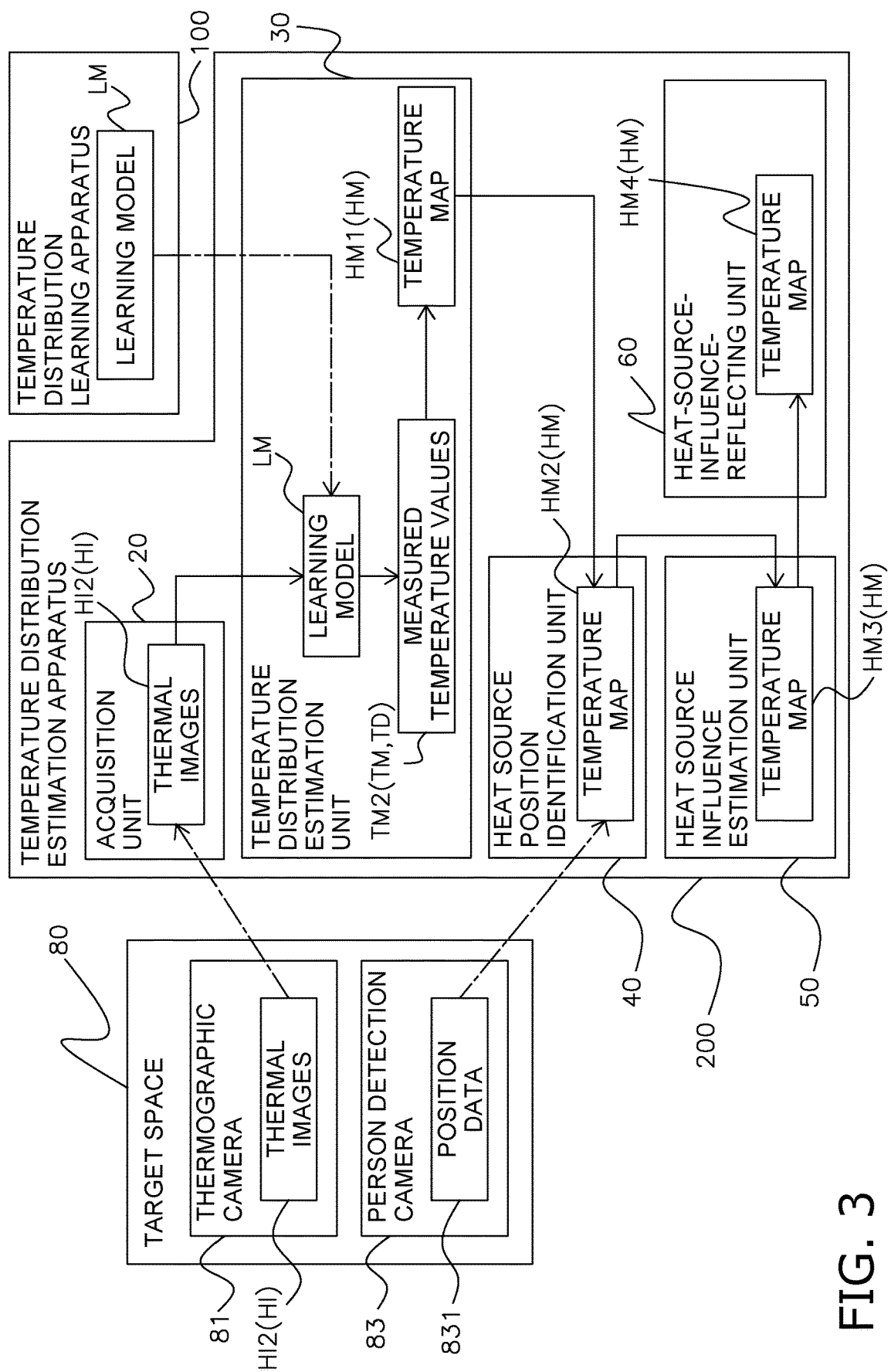
FIG. 3 is a configuration diagram of temperature distribution estimation processing.

As shown in FIG. 3, the acquisition unit 20 acquires thermal images HI2 from the thermographic camera 81 shown in FIG. 5. The acquisition unit 20 acquires the thermal images HI2 at predetermined time intervals. The predetermined time intervals are, for example, five-minute intervals.

(2-3-2) Temperature Distribution Estimation Unit

The temperature distribution estimation unit 30 estimates a temperature distribution TD from a thermal image HI2 using a learning model LM created by the temperature distribution learning apparatus 100. The estimated temperature distribution TD is temperature values TM2 measured by the plurality of temperature sensors 82. As shown in FIG. 3, the temperature distribution estimation unit 30 inputs the thermal image HI2 into the learning model LM to output measured temperature values TM2.

Figure 9:
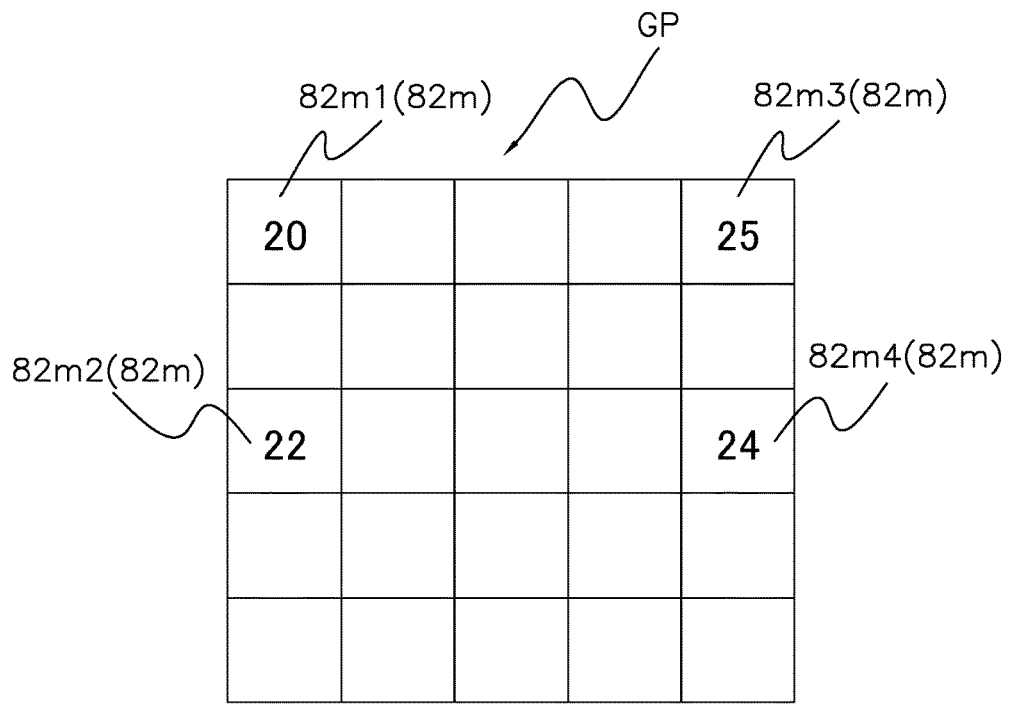
FIG. 9 is a diagram showing an example of a grid plane in a process of creating a temperature map.
Figure 10:
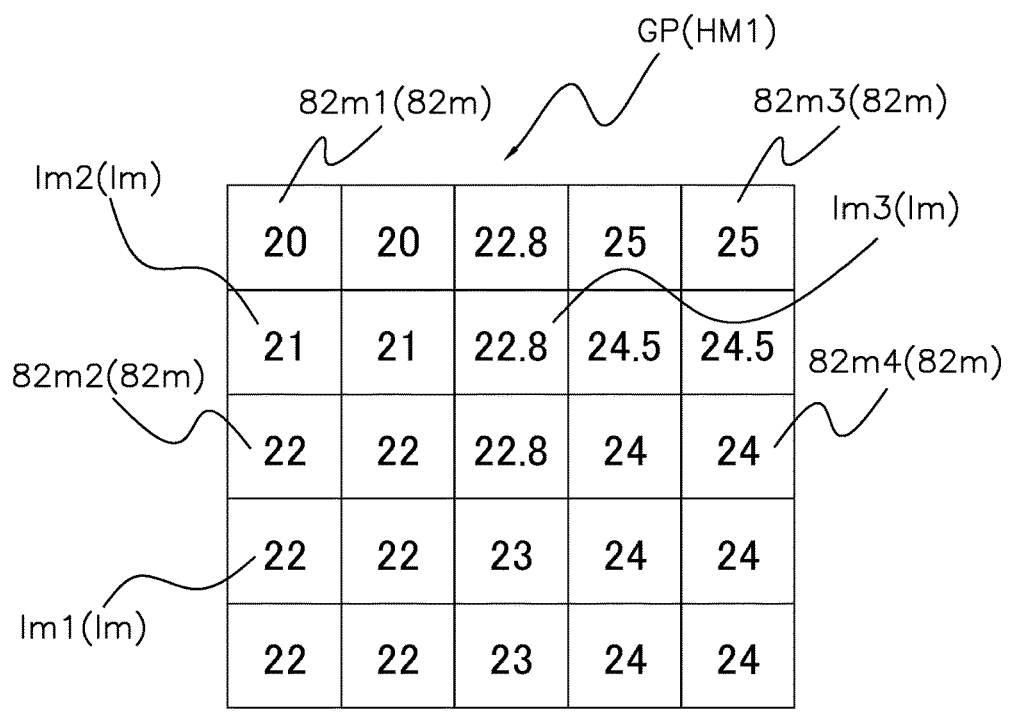
FIG. 10 is a diagram showing an example of a grid plane in a process of creating a temperature map.

In addition, on the basis of the estimated temperature distribution TD, the temperature distribution estimation unit 30 estimates the temperatures in the air of the target space 80 that are not included in the estimated temperature distribution TD. In other words, as shown in FIG. 3, the temperature distribution estimation unit 30 creates a temperature map HM1 from the measured temperature values TM2. The temperature map HM1 is a temperature map HM over which the influence of a person in the target space 80 is not reflected. FIGS. 9 and 10 are drawings showing an example of a grid plane GP in the process of creating a temperature map HM1.

First, the temperature distribution estimation unit 30 inputs corresponding measured temperature values TM2 into cells (temperature sensor cells 82*m*) including temperature sensors 82, among the cells of the grid plane GP. In FIG.

9, the four temperature sensor cells 82*m*1 to 82*m*4 are shown in the grid plane GP of 5×5, by way of an example.

Next, the temperature distribution estimation unit 30 performs interpolation processing for interpolating temperatures in cells into which temperatures are not input. In the interpolation processing of the present embodiment, the temperature distribution estimation unit 30 inputs, into a cell to be interpolated (interpolation cell Im), the temperature of the temperature sensor cell 82*m* closest to the interpolation cell Im. In a case where there is a plurality of the temperature sensor cells 82*m* closest to the interpolation cell Im, the average value of the plurality of temperatures is input into the interpolation cell Im. Here, the temperature sensor cell 82*m* closest to an interpolation cell Im is the temperature sensor cell 82*m*, the number of cells of the grid plane GP vertically, horizontally, or diagonally passed from the interpolation cell Im to which is the smallest. For example, since in FIG. 10, the temperature sensor cell 82*m* closest to an interpolation cell Im1 is the temperature sensor cell 82*m*2, "22° C.", which is the temperature of the temperature sensor cell 82*m*2, is input into the interpolation cell Im1. Further, since the temperature sensor cells 82*m* closest to an interpolation cell Im2 are the temperature sensor cells 82*m*1 and 82*m*2, "21° C.", which is the average value of the temperatures of the temperature sensor cells 82*m*1 and 82*m*2, is input into the interpolation cell Im2. Further, since the temperature sensor cells 82*m* closest to an interpolation cell Im3 are the temperature sensor cells 82*m*1 to 82*m*4, "22.8° C.", which is the average value of the temperatures of the temperature sensor cells 82*m*1 to 82*m*4, is input into the interpolation cell Im3. Note that the interpolation processing is not limited to the interpolation processing of the present embodiment, and another interpolation processing, such as bilinear interpolation, nearest-neighbor interpolation, or bicubic interpolation, may be performed.

In a case where the influence of a person in the target space 80 is not reflected over a temperature map HM, the temperature distribution estimation apparatus 200 outputs a temperature map HM1.

Figures 11, 12:
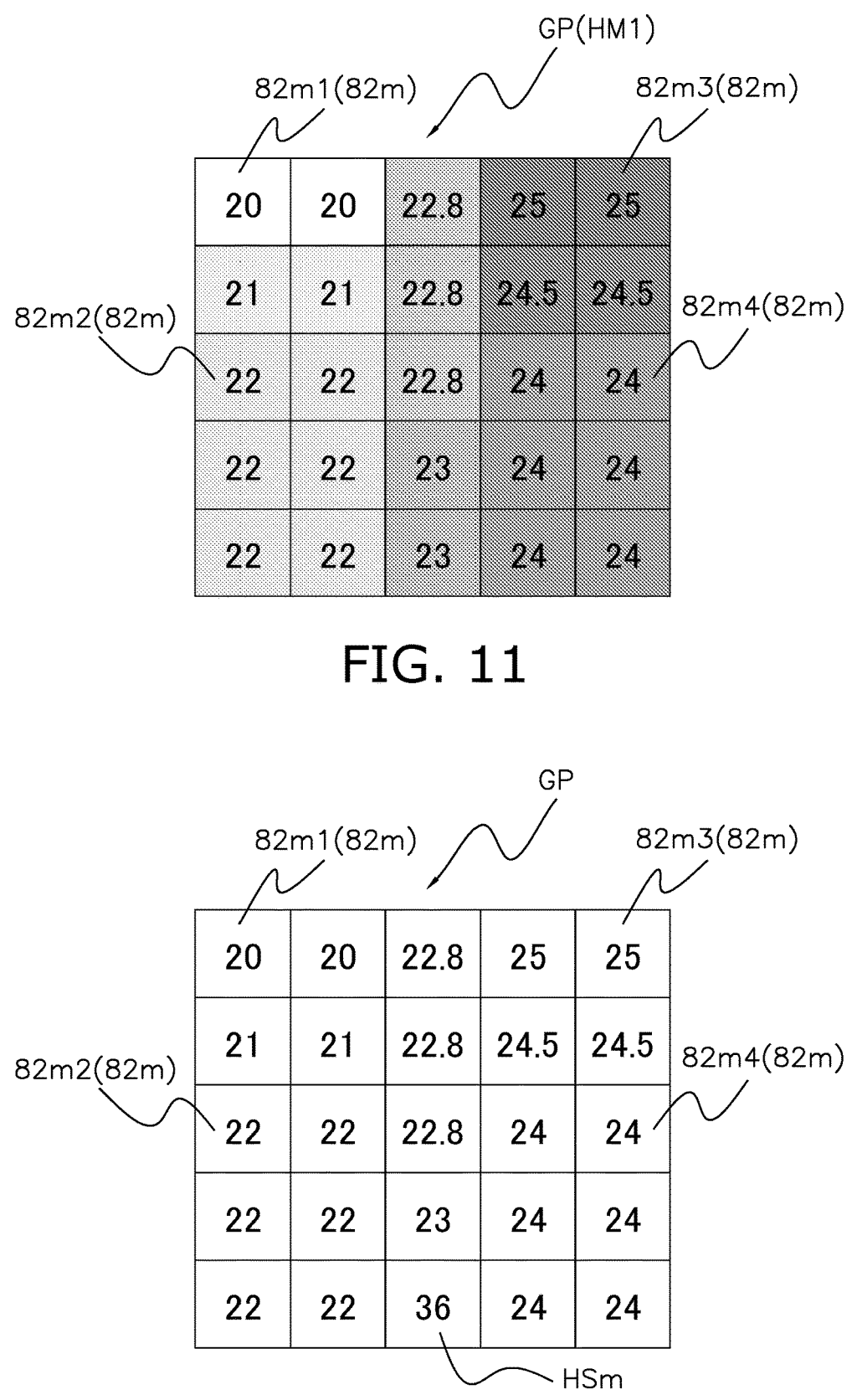

FIG. 11 is a diagram showing an example of the temperature map HM1. In FIG. 11, the level of the temperature in each cell is expressed by grayscale shading.

(2-3-3) Heat Source Position Identification Unit

The heat source position identification unit 40 identifies the position of a heat source HS in the target space 80. In the present embodiment, the heat source position identification unit 40 identifies the position of a person as the position of a heat source HS. Further, the heat source position identification unit 40 identifies the position of a heat source HS with a camera or a depth sensor. In the present embodiment, the heat source position identification unit 40 identifies the position of a person with the person detection camera 83.

As shown in FIG. 3, the heat source position identification unit 40 acquires position data 831 on a person (heat source HS) in the target space 80 from the person detection camera 83 shown in FIG. 5. The heat source position identification unit 40 further acquires a temperature map HM1, and compares the position data 831 with the temperature map HM1 to identify a cell in which the person exists (a person cell HSm) in the temperature map HM1. At this time, the heat source position identification unit 40 distinguishes persons from each other, and identifies person cells HSm.

The heat source position identification unit 40 creates a temperature map HM2 as shown in FIG. 3. The temperature map HM2 is a map in which a person cell HSm in the temperature map HM1 is identified.

(2-3-4) Heat Source Influence Estimation Unit

The heat source influence estimation unit 50 estimates a temperature variation around a heat source HS due to the influence of the heat source HS.

Specifically, as shown in FIG. 3, the heat source influence estimation unit 50 updates a temperature map HM2 to create a temperature map HM3. The temperature map HM3 is a temperature map HM in which a temperature variation around a person is estimated with respect to the temperature map HM2.

Figure 13:
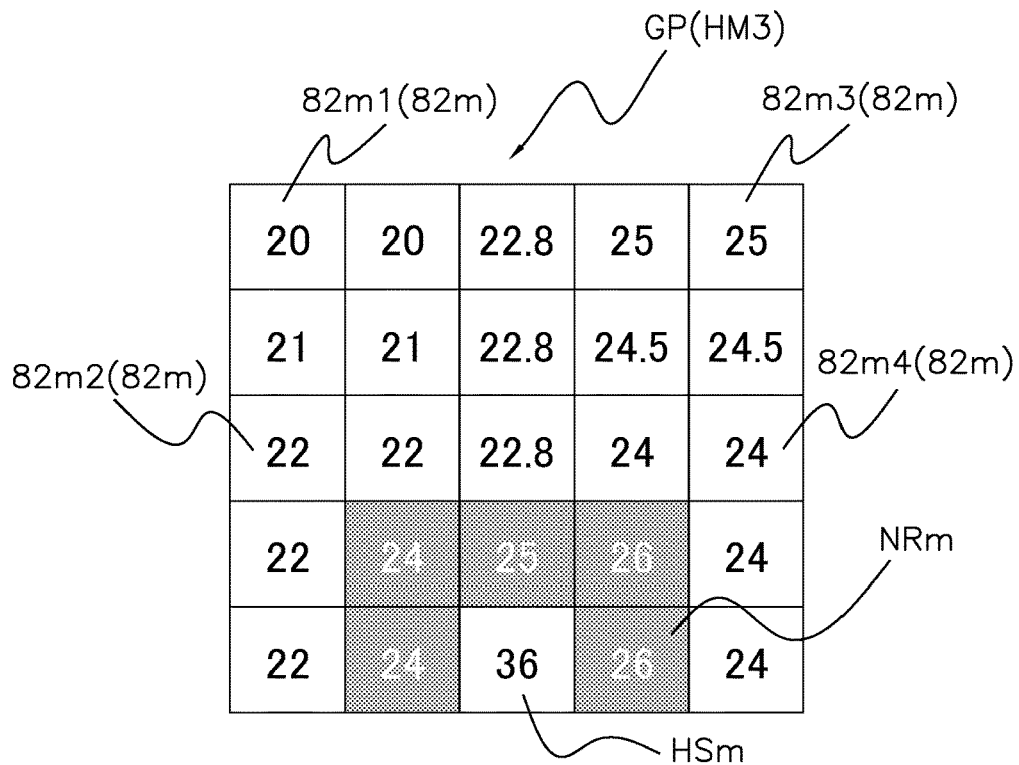
FIG. 13 is a diagram showing an example of a grid plane in a process of creating a temperature map.

In a case where it is considered that the same person stays in the same cell in a temperature map HM2 for a predetermined time, the heat source influence estimation unit 50 updates the temperatures of cells in a region in the neighborhood of the person (neighborhood cells NRm) on the basis of the temperature of the person cell HSm. This is because if the same person stays in the same cell for a predetermined time, the temperature around the person is considered to vary due to the amount of heat emitted from the person. In the present embodiment, the heat source influence estimation unit 50 compares a temperature map HM2 acquired last time with a temperature map HM2 acquired this time, and in a case where the same person is in the same cell, the heat source influence estimation unit 50 considers that the same person stays in the same cell for a predetermined time. FIGS. 12 and 13 are diagrams showing an example of a grid plane GP in the process of creating a temperature map HM3.

First, the heat source influence estimation unit 50 updates the temperature of a person cell HSm in a temperature map HM2 to the temperature of a person. In the present embodiment, the temperature of a person is 36° C. In FIG. 12, "36° C." is input into the person cell HSm.

Next, the heat source influence estimation unit 50 updates the temperatures of thermal-radiation cells TRm. Here, it is assumed that the amount of heat emitted from a person is uniform in all directions in a case where there is no air flow. Further, the amount of heat emitted from a person is inversely proportional to the second power of the distance from the person. Further, a temperature variation in a region in the neighborhood of a person is caused by the distance from the person to the neighborhood region and the temperature of the neighborhood region before the updating. Further, in the neighborhood region, non-linear conversion is performed using a sigmoid function or the like to convert the amount of applied heat, to the temperature variation so that the person temperature is not exceeded. Further, since a heat source HS (person) is independent, it is assumed to be Markovian, and the temperature of the original heat source HS (person) does not decrease although an amount of heat is further emitted from a region to which the amount of heat is applied, and the temperature of the region from which the amount of heat is emitted decreases.

In a case where in an actual office, an air conditioner is operating, an air flow is generated, and heat conduction is not uniform in all directions. The air flow varies due to the installation position of the air conditioner, furniture in the office, the flow rate, and the like. However, since the air flow is stable in a steady state, the anisotropy of heat conduction can be preliminarily learned. A specific example of the preliminary learning of a model for estimating the parameters of the anisotropy is to train, in a case where persons stay for a certain time or more, an estimation model using the control parameters of the air conditioner, the number of the staying persons, and the staying time, as explanatory variables, and the parameters for determining the amount of heat conducted in four or eight directions, as objective variables. The parameters for determining the amount of heat conducted in four or eight directions, which are objective variables, are calculated from the distribution of the temperature immediately before the persons appearing and the distribution of the temperature after the staying, and are used as training data. When staying of a person is detected in a learned cell, the amount of conducted heat is estimated with the control parameters of the air conditioner, the number of staying persons, and the staying time, and thus the temperature from a steady state can be corrected. For an unlearned cell, a plurality of values estimated when the explanatory variables are input into surrounding learned cells is obtained and interpolated to obtain parameters for calculating the amount of conducted heat, and thus the amount of conducted heat is determined to enable the temperature correction.

In FIG. 13, the temperatures in a temperature map HM2 are updated with a thermal-propagation model in which the above-described conditions are considered. In FIG. 13, cells whose temperatures are indicated by white letters are neighborhood cells NRm, and only the temperatures of the neighborhood cells NRm are updated for simplification.

(2-3-5) Heat-Source-Influence-Reflecting Unit

Figure 14:
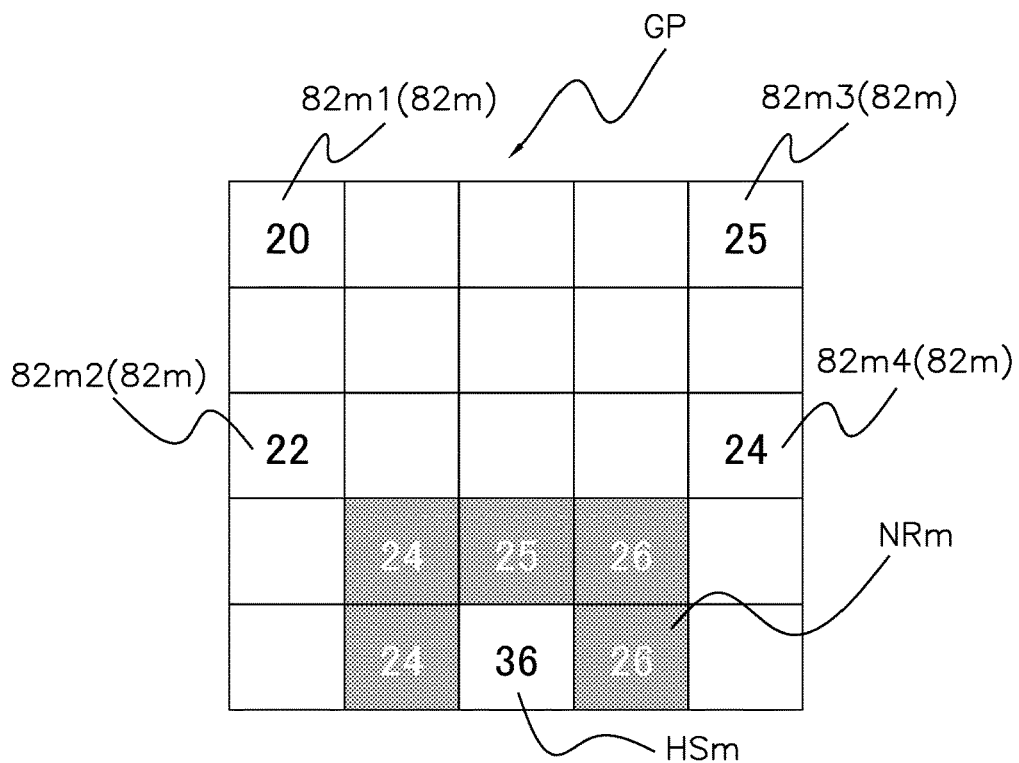
FIG. 14 is a diagram showing an example of a grid plane in a process of creating a temperature map.
Figure 15:
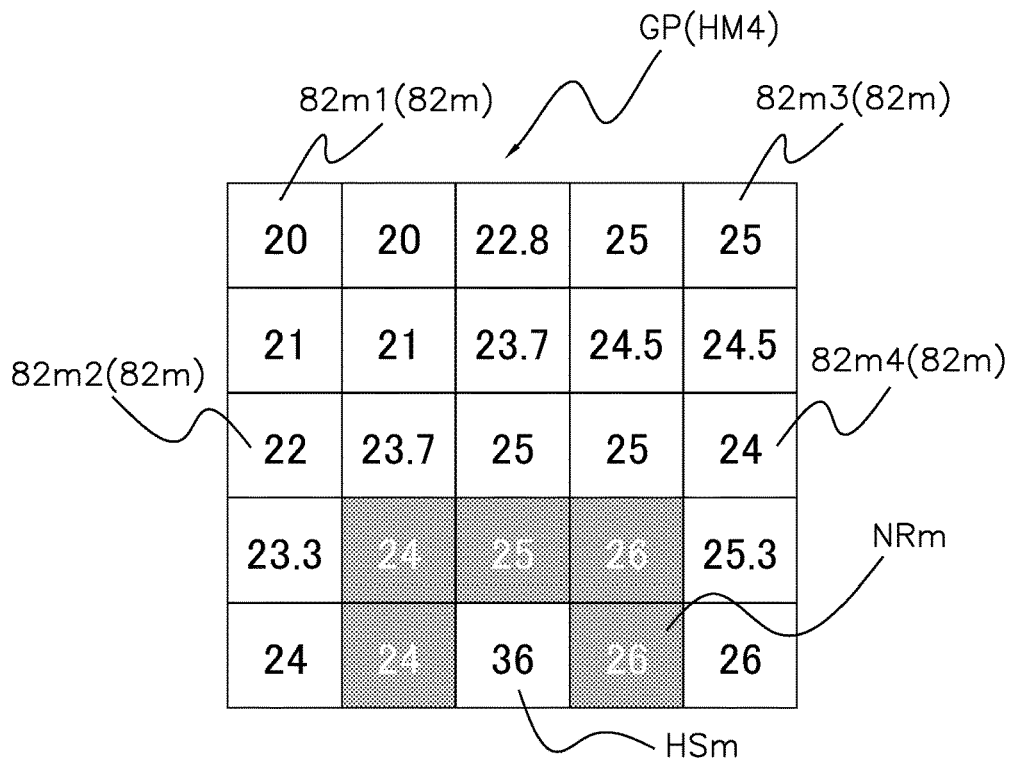
FIG. 15 is a diagram showing an example of a grid plane in a process of creating a temperature map.

The heat-source-influence-reflecting unit 60 reflects a temperature variation around a heat source HS estimated by the heat source influence estimation unit 50, to the temperatures in the air of the target space 80 estimated by the temperature distribution estimation unit 30. Specifically, as shown in FIG. 3, the heat-source-influence-reflecting unit 60 updates a temperature map HM3 to create a temperature map HM4. The temperature map HM4 is a temperature map HM over which the influence of a person in the target space 80 is reflected. FIGS. 14 and 15 are diagrams showing an example of a grid plane GP in the process of creating a temperature map HM4.

The heat-source-influence-reflecting unit 60 regards cells except "temperature sensor cells 82$m$ and cells whose temperatures have been updated by the heat source influence estimation unit 50" in a temperature map HM3, as interpolation cells Im, and performs interpolation processing again. In the present embodiment, the heat-source-influence-reflecting unit 60 performs interpolation processing similar to the interpolation processing performed by the temperature distribution estimation unit 30. In FIG. 14, among the cells of the temperature map HM3 shown in FIG. 13, cells except "temperature sensor cells 82$m$1 to 82$m$4, a person cell HSm, and neighborhood cells NRm" are regarded as interpolation cells Im and are made empty. In FIG. 15, the interpolation cells Im are filled by the interpolation processing.

In a case where the influence of a person in the target space 80 is reflected over a temperature map HM, the temperature distribution estimation apparatus 200 outputs a temperature map HM4.

Figure 16:
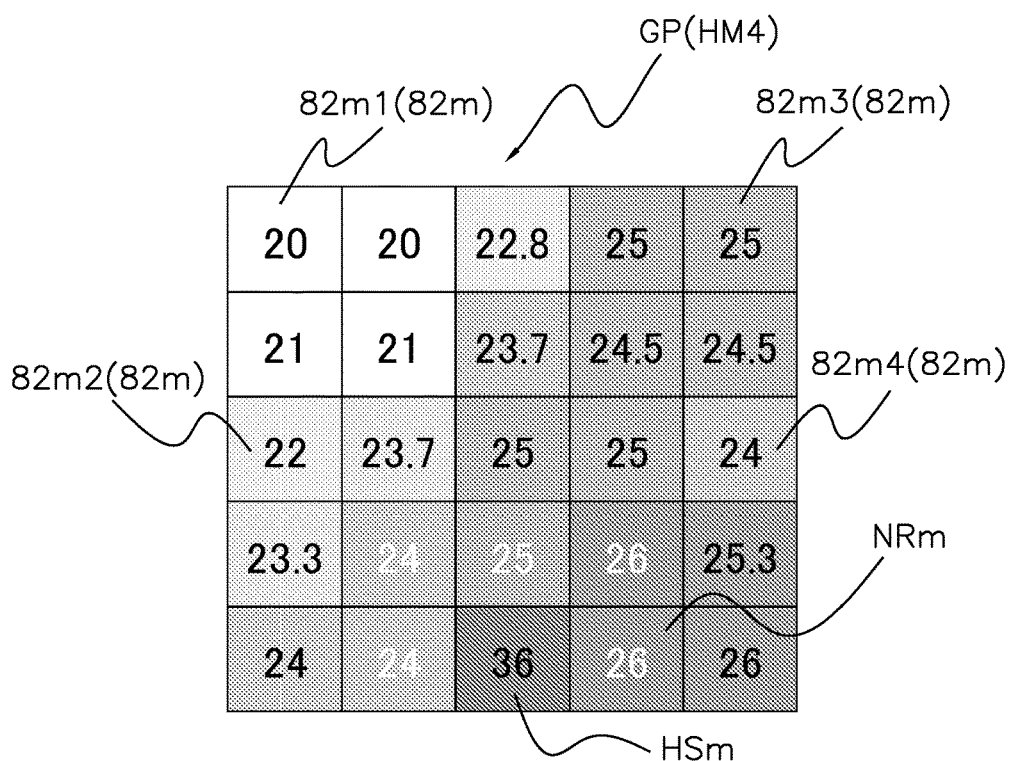
FIG. 16 is a diagram showing an example of a temperature map.

FIG. 16 is a diagram showing an example of the temperature map HM4. In FIG. 16, the level of the temperature in each cell is expressed by grayscale shading.

(3) Processing (3-1) Temperature Distribution Learning Processing

Figure 17:
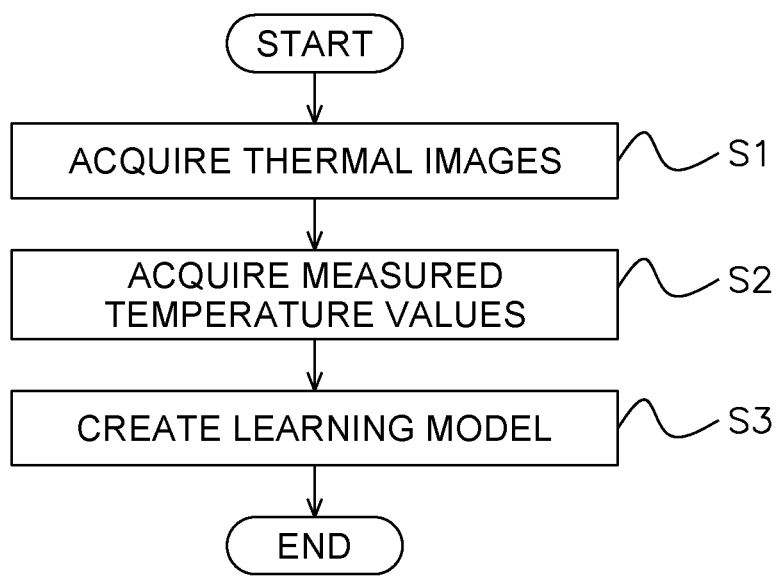
FIG. 17 is a flowchart of the temperature distribution learning processing.

The temperature distribution learning processing will be described with reference to the flowchart of FIG. 17.

As shown in step S1, the temperature distribution learning apparatus 100 acquires thermal images HI1 from the thermographic camera 81 shown in FIG. 4. The thermal images HI1 are thermal images HI1 of the target space 80 at predetermined time intervals in a predetermined period.

In response to the acquisition of the thermal images HI1, as shown in step S2, the temperature distribution learning apparatus 100 acquires measured temperature values TM1 from the plurality of temperature sensors 82 shown in FIG. 4. The measured temperature values TM1 are measured at the same times as the acquired thermal images HI1.

In response to the acquisition of the measured temperature values TM1, as shown in step S3, the temperature distribution learning apparatus 100 creates a learning model LM using the thermal images HI1 as an explanatory variable and the measured temperature values TM1 as an objective variable.

(3-2) Temperature Distribution Estimation Processing

The temperature distribution estimation processing will be described with reference to the flowchart of FIG. 18.

As shown in step S11, the temperature distribution estimation apparatus 200 acquires a thermal image HI2 from the thermographic camera 81 shown in FIG. 5.

In response to the acquisition of the thermal image HI2, as shown in step S12, the temperature distribution estimation apparatus 200 estimates measured temperature values TM2 from the thermal image HI2 using a learning model LM created by the temperature distribution learning apparatus 100.

In response to the estimation of the measured temperature values TM2, as shown in step S13, the temperature distribution estimation apparatus 200 creates, by interpolation processing, a temperature map HM1 over which the influence of a person in the target space 80 is not reflected.

In response to the creation of the temperature map HM1, as shown in step S14, the temperature distribution estimation apparatus 200 acquires position data 831 on the person in the target space 80 from the person detection camera 83 shown in FIG. 5.

In response to the acquisition of the position data 831 on the person in the target space 80, as shown in step S15, the temperature distribution estimation apparatus 200 creates a temperature map HM2 in which the position of the person in the temperature map HM1 is identified.

In response to the creation of the temperature map HM2, as shown in step S16, the temperature distribution estimation apparatus 200 compares the temperature map HM2 created last time with the temperature map HM2 created this time to determine whether or not the same person is in the same cell.

In a case where the same person is in the same cell, the temperature distribution estimation apparatus 200 proceeds to step S17. In a case where the same person is not in the same cell, the temperature distribution estimation apparatus 200 proceeds to step S20.

In a case of proceeding from step S16 to step S17, the temperature distribution estimation apparatus 200 creates a temperature map HM3 in which a temperature variation around the person in the target space 80 is estimated.

In response to the creation of the temperature map HM3, as shown in step S18, the temperature distribution estimation apparatus 200 creates a temperature map HM4 over which the influence of the person in the target space 80 is reflected.

In response to the creation of the temperature map HM4, as shown in step S19, the temperature distribution estimation apparatus 200 outputs the temperature map HM4.

In a case of proceeding from step S16 to step S20, the temperature distribution estimation apparatus 200 outputs the temperature map HM1 since there is no surrounding temperature variation due to the influence of a person.

Figure 18:
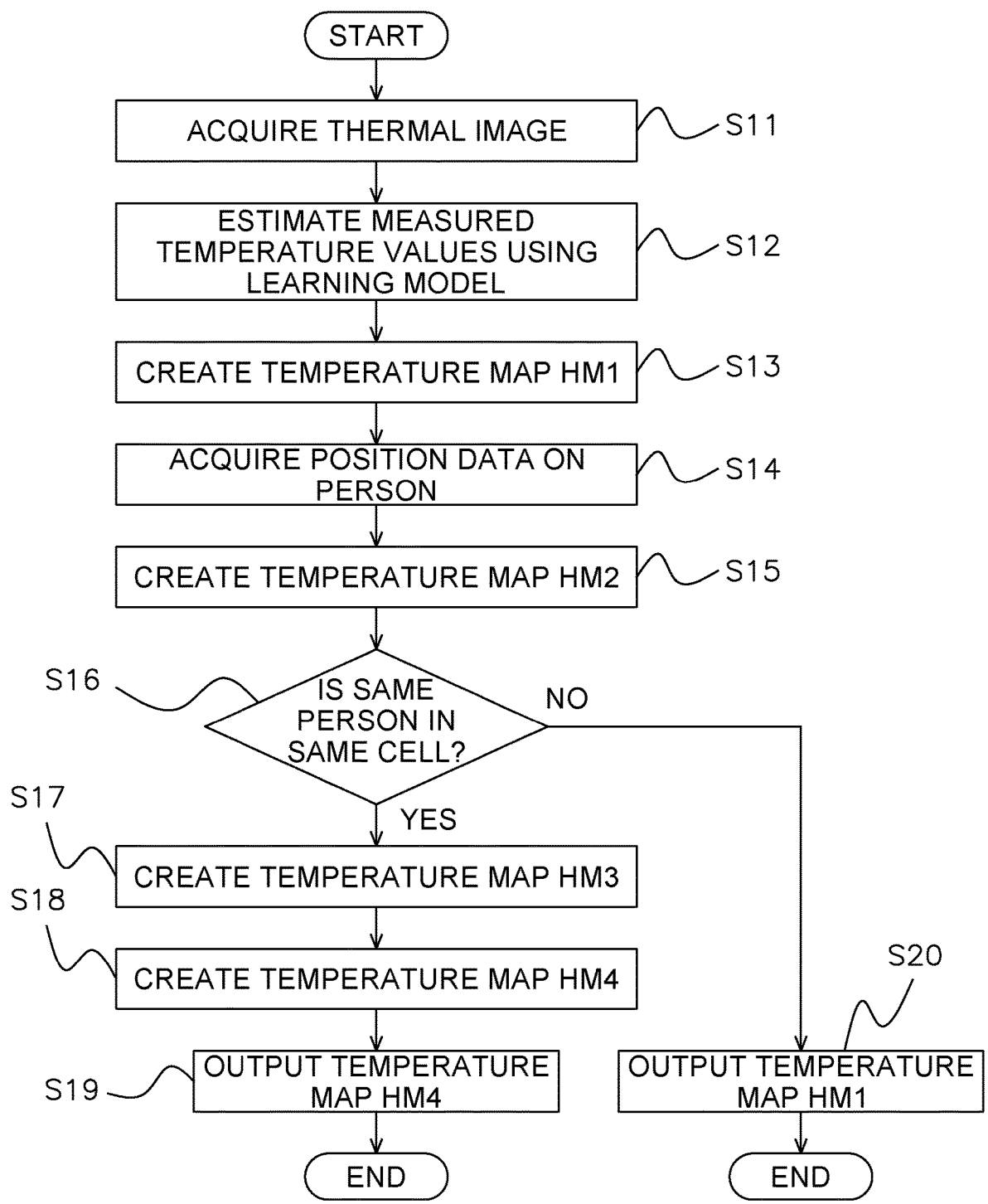
FIG. 18 is a flowchart of the temperature distribution estimation processing.

As shown in FIG. 18, the temperature distribution estimation processing is performed each time the acquisition unit 20 acquires a thermal image HI2. Therefore, the temperature distribution estimation apparatus 200 outputs a temperature map HM1 or a temperature map HM4 at predetermined time intervals at which the acquisition unit 20 acquires a thermal image HI2.

(4) Features (4-1)

It is impossible to directly know the temperature distribution of a target space from a thermal image obtained by a thermographic camera installed in the target space. The reason is that the thermographic camera measures, from heat radiated from the surface of an object, the temperature of the surface of the object. Accordingly, for example, there is a technique of learning the temperature distribution of a target space using thermal images of a target space and information on a blowing outlet of an air conditioner.

However, there is a problem that if there is no air conditioner in the target space, information on a blowing outlet of the air conditioner is not obtained, and the temperature distribution of the target space cannot be learned.

In the temperature distribution learning apparatus 100 of the present embodiment, a learning model LM learns temperature distributions TD, which are an objective variable, and thermal images HI, which are an explanatory variable and are related to the target space 80, in association with each other. As a result, the temperature distribution learning apparatus 100 can learn the temperature distributions TD of the target space 80 even if there is no air conditioner in the target space 80. Note that even in a case where there is an air conditioner in the target space 80, the temperature distribution learning apparatus 100 can learn the temperature distributions TD of the target space 80 without using information related to the air conditioner or using information related to the air conditioner in combination.

(4-2)

For the temperature distribution learning apparatus 100 of the present embodiment, the temperature distribution TD is temperature values TM1 measured at a plurality of points in the air of the target space 80. As a result, the temperature distribution learning apparatus 100 can learn, from thermal images HI related to the target space 80, a learning model LM for estimating temperature values TM measured at a plurality of points in the air of the target space 80.

(4-3)

There has been a technique in which a plurality of temperature sensors is installed in a target space, and on the basis of these temperature sensors, the temperature distribution of the target space is estimated. The estimated temperature distribution is used for control of the air conditioner, or the like.

However, since the accuracy of the temperature distribution to be estimated depends on the number of temperature sensors to be installed, it is necessary to install many temperature sensors to estimate the temperature distribution with high accuracy. For this reason, there is a problem that in order to estimate the temperature distribution with high accuracy, the target space becomes an inconvenient space, and the installation cost of the temperature sensors also increases.

In the temperature distribution estimation apparatus 200 of the present embodiment, the temperature distribution estimation unit 30 estimates a temperature distribution TD from a thermal image HI using a learning model LM of the temperature distribution learning apparatus 100. The acquisition unit 20 acquires a thermal image HI2. As a result, the temperature distribution estimation apparatus 200 can estimate a temperature distribution TD from a thermal image HI2 even without the temperature sensors 82.

(4-4)

In the temperature distribution estimation apparatus 200 of the present embodiment, the temperature distribution estimation unit 30 further estimates, on the basis of the estimated temperature distribution TD, the temperatures in the air of the target space 80, which are not included in the estimated temperature distribution TD. As a result, the temperature distribution estimation apparatus 200 can estimate the temperature in any air of the target space 80.

(4-5)

In the temperature distribution estimation apparatus 200 of the present embodiment, the heat source position identification unit 40 identifies the position of a heat source HS in the target space 80. The heat source influence estimation unit 50 estimates a temperature variation around the heat source HS due to the influence of the heat source HS. The heat-source-influence-reflecting unit 60 reflects the temperature variation around the heat source HS estimated by the heat source influence estimation unit 50, to the temperatures in the air of the target space 80 estimated by the temperature distribution estimation unit 30. As a result, the temperature distribution estimation apparatus 200 can estimate the temperatures in the air of the target space 80 to which the influence of the heat source HS is reflected.

In a case where the air flow in the target space 80 is constant, the relationship between the structure and one point which is a target in the air is expressed only by the heat conduction of the air, and can be determined from many structure surface temperatures at different distances. Further, due to the different distances from the structure and different associated heat conduction paths, the temperatures of the many target points in the air can be estimated in association with each target point.

(4-6)

In the temperature distribution estimation apparatus 200 of the present embodiment, the heat source position identification unit 40 identifies the position of a heat source HS using a camera or a depth sensor. As a result, the temperature distribution estimation apparatus 200 can identify the position of a heat source HS using the camera or the depth sensor.

(4-7)

In the temperature distribution estimation apparatus 200 of the present embodiment, the heat source position identification unit 40 identifies the position of a person as the position of a heat source HS. As a result, the temperature distribution estimation apparatus 200 can estimate the temperatures in the air of the target space 80 to which the influence of a person is reflected.

(5) Modifications (5-1) Modification 1A

In the present embodiment, the temperature distribution learning apparatus 100 performs the temperature distribution learning processing. However, the temperature distribution learning processing may be regarded as a temperature distribution learning method.

Specifically, the temperature distribution learning method learns a temperature distribution TD including the temperature at least a first point in the air of the target space 80. The temperature distribution learning method includes a learning step. The learning step learns temperature distributions TD, which are an objective variable, and thermal images HI, which are an explanatory variable and are related to the target space 80, in association with each other. The learning step learns on the basis of training data including the temperature distributions TD and the thermal images HI.

The learning step corresponds to the function of the learning unit 10 in the temperature distribution learning processing. Further, the learning step corresponds to steps S1 to S3 in FIG. 17.

As a result, the temperature distribution learning method can be executed in any apparatus.

(5-2) Modification 1B

In the present embodiment, the temperature distribution estimation apparatus 200 performs the temperature distribution estimation processing. However, the temperature distribution estimation processing may be regarded as a temperature distribution estimation method.

Specifically, the temperature distribution estimation method includes a temperature distribution estimation step and an acquisition step. The temperature distribution estimation step estimates a temperature distribution TD from a thermal image HI by the temperature distribution learning method. On the basis of the estimated temperature distribution TD, the temperature distribution estimation step further estimates the temperatures in the air of the target space 80 that are not included in the estimated temperature distribution TD. The acquisition step acquires a thermal image HI.

The temperature distribution estimation method further includes a heat source position identification step, a heat source influence estimation step, and a heat-source-influence-reflecting step. The heat source position identification step identifies the position of a heat source HS in the target space 80. The heat source influence estimation step estimates a temperature variation around the heat source HS due to the influence of the heat source HS. The heat-source-influence-reflecting step reflects the temperature variation around the heat source HS estimated by the heat source influence estimation step, to the temperatures in the air of the target space 80 estimated in the temperature distribution estimation step.

The acquisition step corresponds to the function of the acquisition unit 20 in the temperature distribution estimation processing. Further, the acquisition step corresponds to step S11 in FIG. 18.

The temperature distribution estimation step corresponds to the function of the temperature distribution estimation unit 30 in the temperature distribution estimation processing. Further, the temperature distribution estimation step corresponds to steps S12 and S13 in FIG. 18.

The heat source position identification step corresponds to the function of the heat source position identification unit 40 in the temperature distribution estimation processing. Further, the heat source position identification step corresponds to steps S14 and S15 in FIG. 18.

The heat source influence estimation step corresponds to the function of the heat source influence estimation unit 50 in the temperature distribution estimation processing. Further, the heat source influence estimation step corresponds to step S17 in FIG. 18.

The heat-source-influence-reflecting step corresponds to the function of the heat-source-influence-reflecting unit 60 in the temperature distribution estimation processing. Further, the heat-source-influence-reflecting step corresponds to step S18 in FIG. 18.

As a result, the temperature distribution estimation method can be executed in any apparatus.

(5-3) Modification 1C

In the present embodiment, the temperature distribution estimation unit 30 and the heat-source-influence-reflecting unit 60 perform the interpolation processing to interpolate temperatures in interpolation cells Im of a temperature map HM, in which temperatures are not filled. In the interpolation processing of the present embodiment, input into an interpolation cell Im is the temperature of a temperature sensor cell 82m closest to the interpolation cell Im. In a case where there is a plurality of temperature sensor cells 82m closest to the interpolation cell Im, the average value of the plurality of temperatures is input into the interpolation cell Im.

However, for the interpolation processing, a deep convolutional generative adversarial network (DCGAN), a super resolution GAN (SRGAN), a temporally coherent GAN (TecoGAN), or the like to which a generative adversarial network (GAN) is applied may be used. As a result, the temperature distribution estimation unit 30 and the heat-source-influence-reflecting unit 60 can create a temperature map HM with higher definition than the interpolation processing of the present embodiment.

Figure 19:
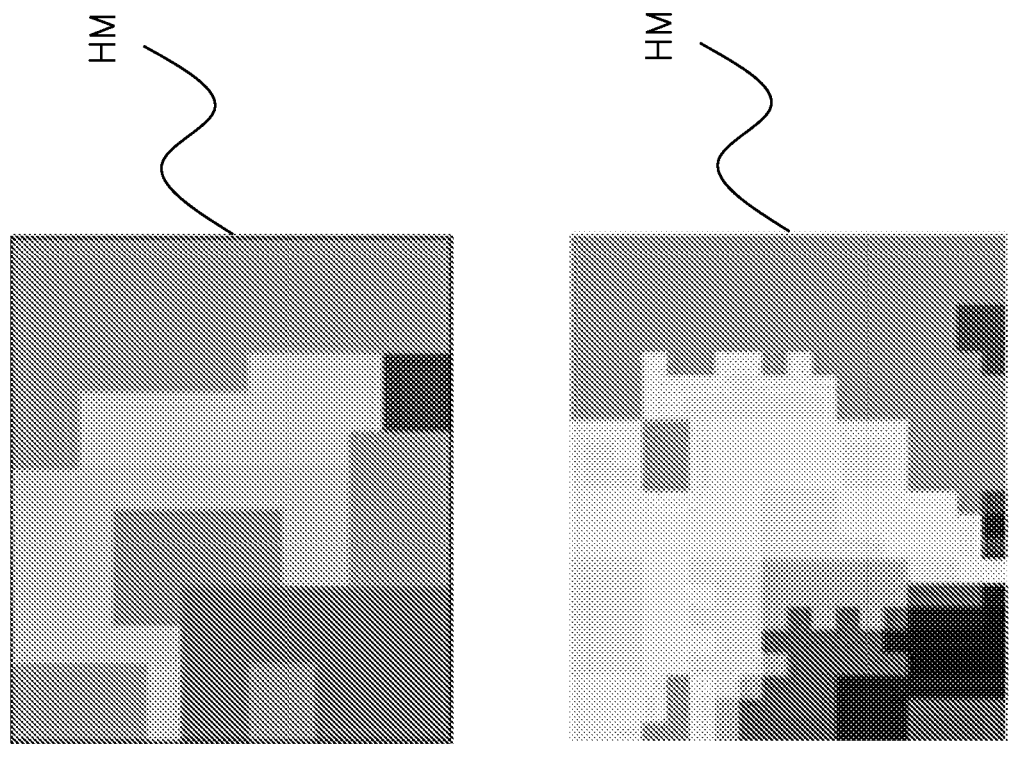
FIG. 19 is a diagram showing a comparison of interpolation processing results.
Figure 19:
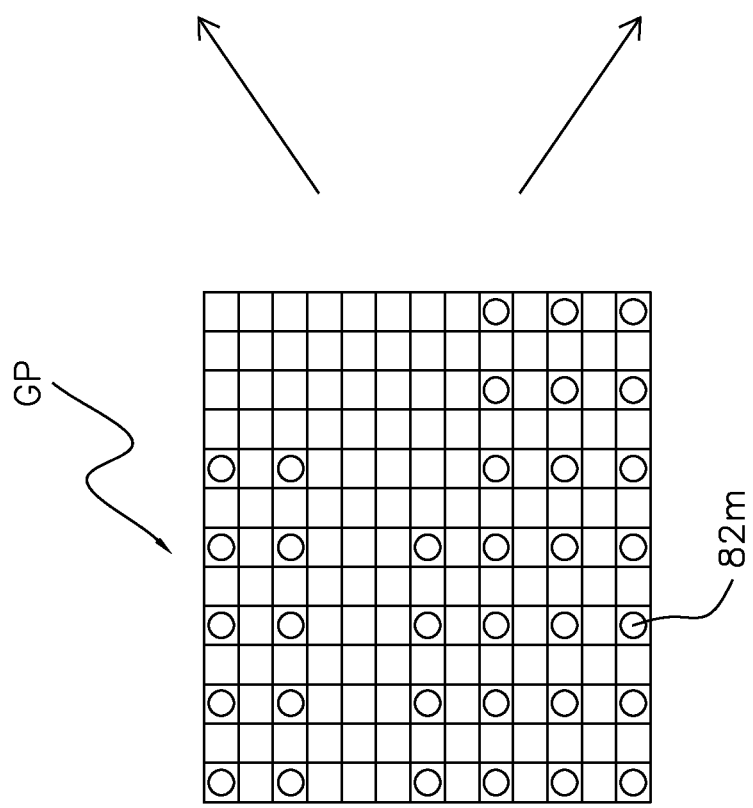

FIG. 19 is a diagram showing a comparison of interpolation processing results. On the left side of FIG. 19, a grid plane GP of 13×13 with 38 temperature sensor cells 82m is shown. The temperature sensor cells 82m are indicated by circles. The upper right image is a temperature map HM created by performing the interpolation processing of the present embodiment on the basis of temperature values TM measured by these temperature sensors 82. On the other hand, the lower right image is a temperature map HM created using the TecoGAN. It can be seen that the lower right image is a higher-definition image than the upper right image.

(5-4) Modification 1D

In the present embodiment, a learning model LM is a normal neural network. However, the learning model LM may also be particularly a convolutional neural network (CNN). Since the CNN is effective in a case where an input is an image, there is a possibility that a learning model LM with higher prediction accuracy can be created.

As the CNN, for example, a residual network (ResNet) or the like is used. A thermal image HI is input into the input layer. The latter half of the intermediate layer is a fully connected layer. Measured temperature values TM are output as a vector into the output layer.

(5-5) Modification 1E

In the present embodiment, the temperature distribution learning apparatus 100 learns a thermal image HI1 acquired from the thermographic camera 81, and measured temperature values TM1 acquired from the plurality of temperature sensors 82, in association with each other.

However, the temperature distribution learning apparatus 100 may first create a temperature map HM0 from measured temperature values TM1 by interpolation processing, and then learn the temperature map HM0 and a thermal image HI1 in association with each other.

Figure 20:
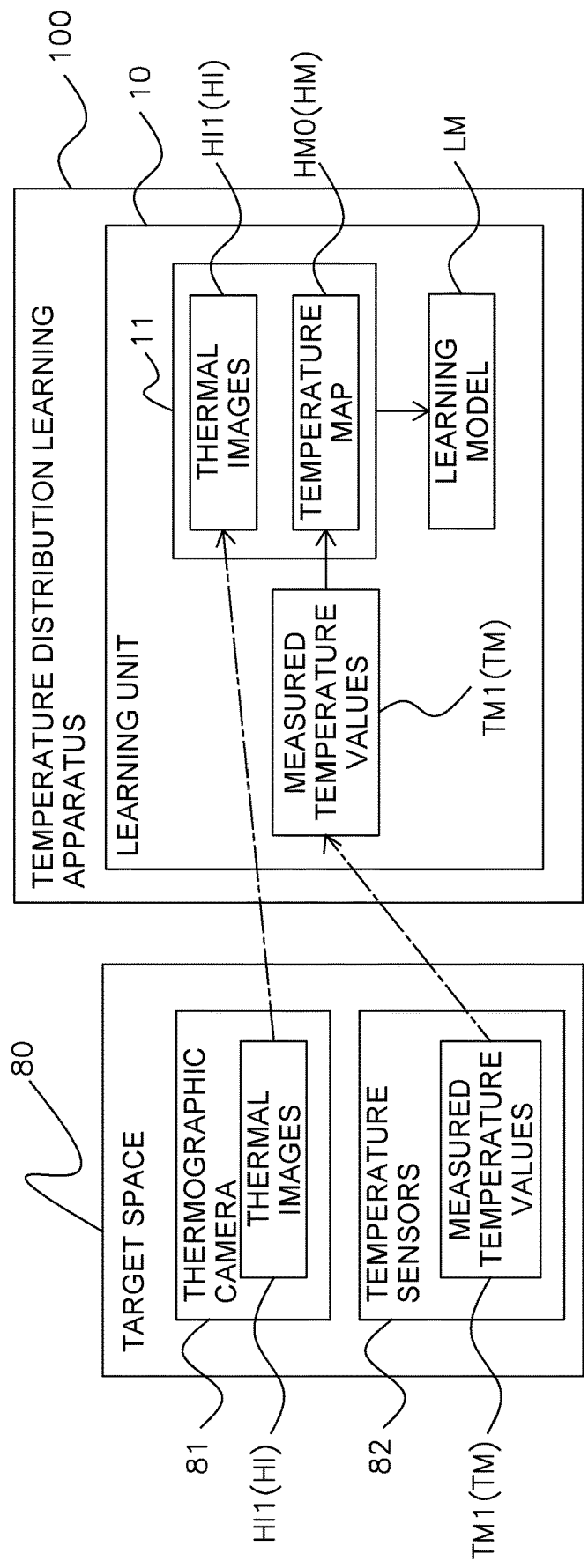
FIG. 20 is a configuration diagram of temperature distribution learning processing according to a modification 1E.

FIG. 20 is a configuration diagram of temperature distribution learning processing according to the present modification. As shown in FIG. 20, unlike in FIG. 2, in response to acquisition of measured temperature values TM1, the learning unit 10 creates a temperature map HM0 by interpolation processing. The learning unit 10 learns the temperature map HM0 and a thermal image HI1 in association with each other, and creates a learning model LM.

As a result, the temperature distribution estimation apparatus 200 inputs a thermal image HI2 to the created learning model LM to directly output a temperature map HM1 over which the influence of a person in the target space 80 is not reflected.

Figure 21:
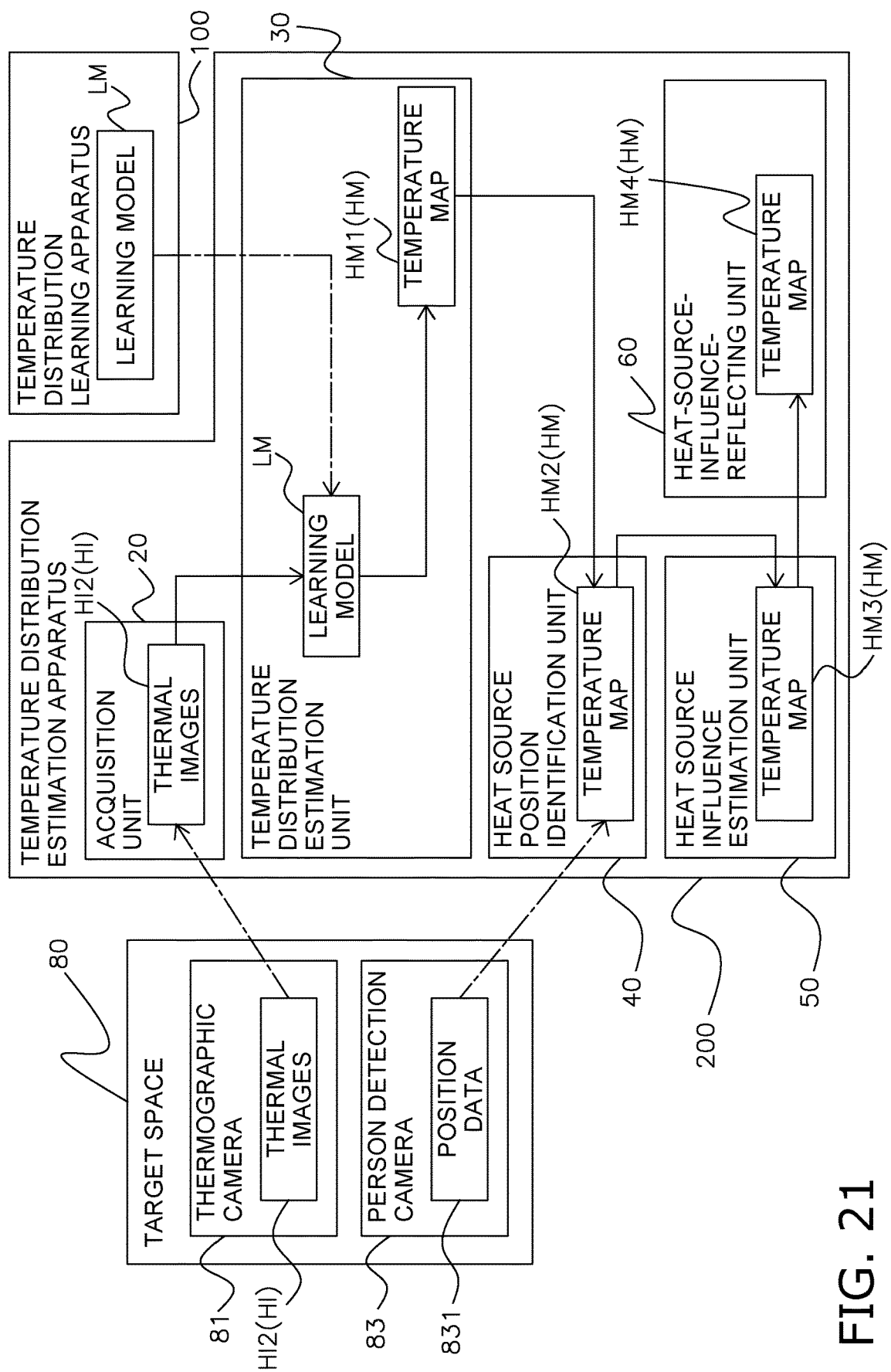
FIG. 21 is a configuration diagram of temperature distribution estimation processing according to the modification 1E.

FIG. 21 is a configuration diagram of temperature distribution estimation processing according to the present modification. As shown in FIG. 21, unlike in FIG. 3, the temperature distribution estimation unit 30 inputs a thermal image HI2 into a learning model LM to output a temperature map HM1.

(5-6)

Figure 22:
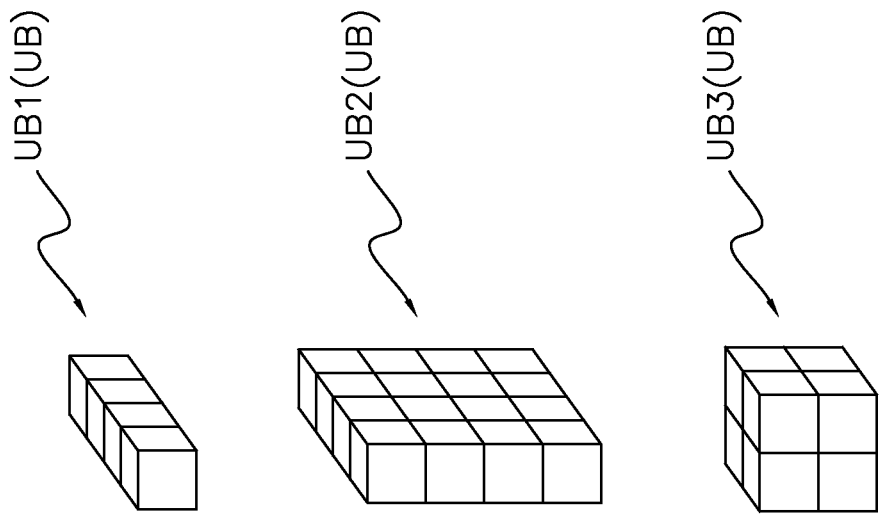
FIG. 22 is a diagram showing an example of a temperature distribution in a grid space.
Figure 22:
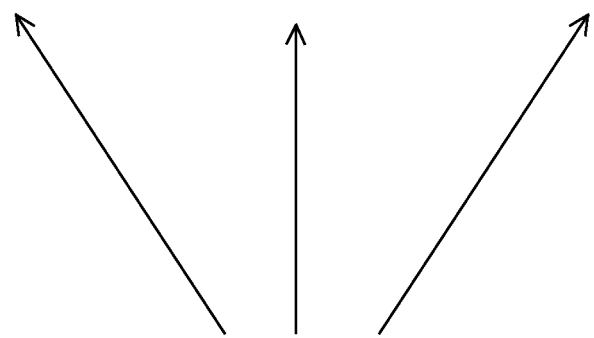
Figure 22:
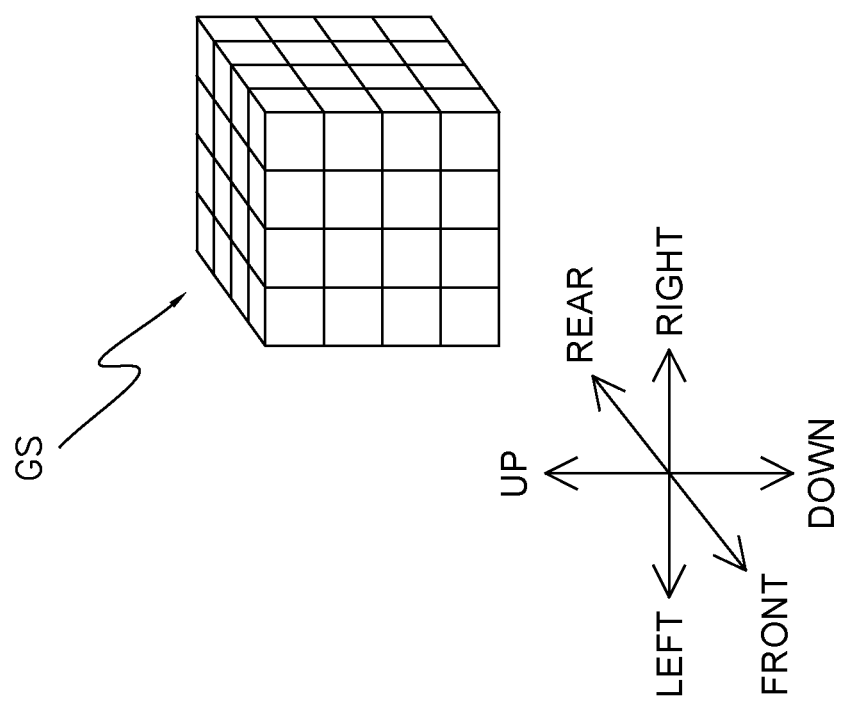

In the present embodiment, in a grid plane GP, one temperature is defined in a unit of cell. However, in general, in a grid space GS, one temperature may be defined in an optional unit. FIG. 22 is a diagram showing an example of a temperature distribution TD in a grid space GS. The grid space GS is obtained by dividing a target space 80 into 4×4×4 blocks. In this case, a unit for defining one temperature may be, for example, blocks linearly connected, such as a unit block UB1. Alternatively, a unit for defining one temperature may be, for example, blocks connected in a planar shape, such as a unit block UB2. Alternatively, a unit for defining one temperature may be, for example, blocks piled up in a cubic shape, such as a unit block UB3.

For example, the temperature of the unit block UB may be defined as the average value of temperatures measured by temperature sensors 82 installed in the respective blocks constituting the unit block UB. Alternatively, for example, for the unit block UB3, a temperature sensor 82 may be installed at the center point of the unit block UB3, and a value measured by the temperature sensor 82 may be defined as the temperature of the unit block UB3.

Figure 23:
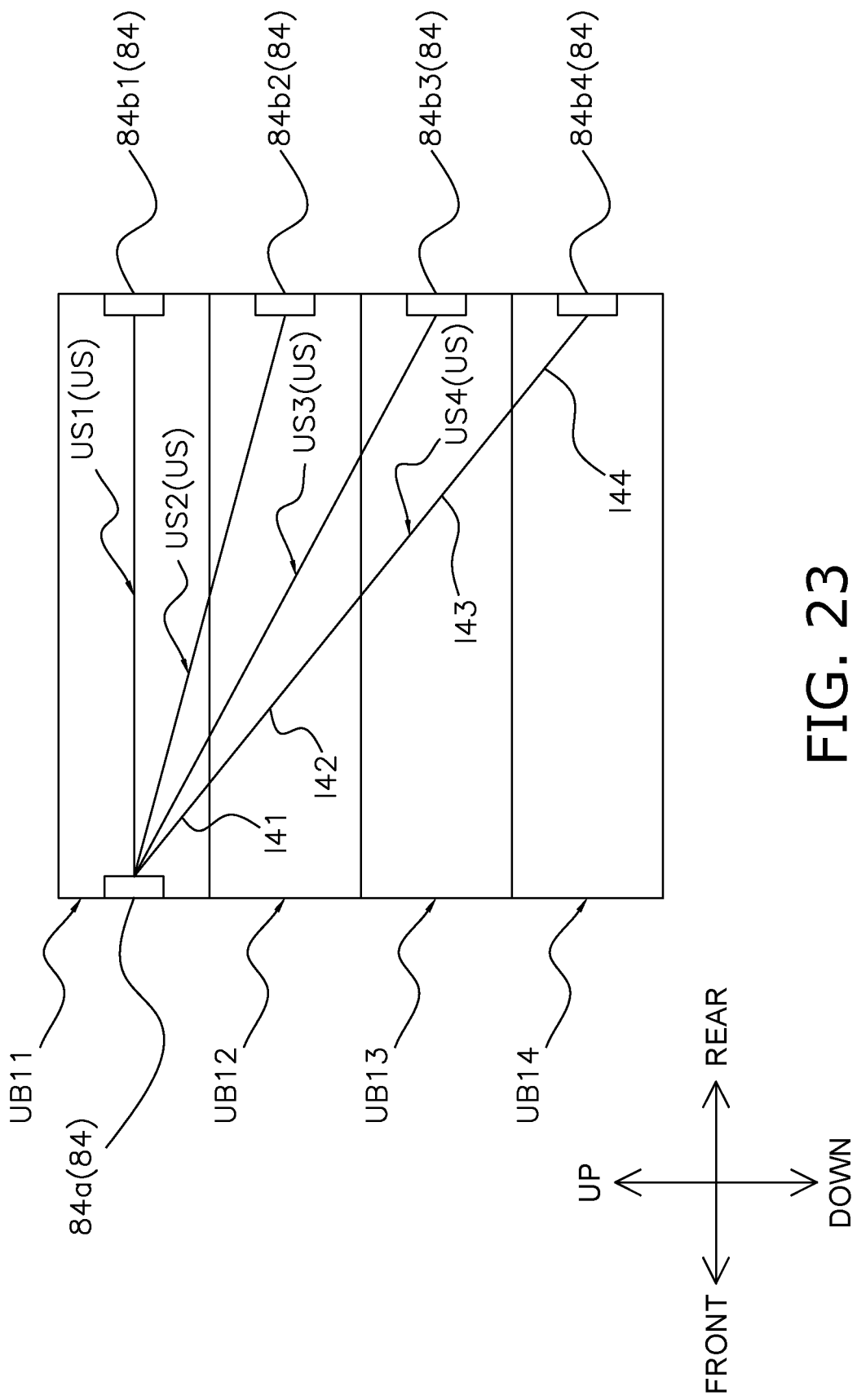
FIG. 23 is a diagram showing an example of a method for measuring a temperature on a straight line.

Alternatively, for example, for the unit block UB1, a temperature on a straight line may be measured using an ultrasonic wave US, and the measured temperature may be defined as the temperature of the unit block UB1. FIG. 23 is a diagram showing an example of a method for measuring a temperature on a straight line. FIG. 23 shows a method for measuring each temperature of four unit blocks UB1 stacked in an up-down direction in the grid space GS in FIG. 22. FIG. 23 shows the four unit blocks UB1 stacked in the up-down direction as viewed from the right. The unit blocks UB1 are referred to as a unit block UB11, a unit block UB12, a unit block UB13, and a unit block UB14 from the top. An ultrasonic wave generator 84 is installed in each unit block UB1. Specifically, in the unit block UB11, ultrasonic wave generators 84a and 84b1 are installed at front- and rear-direction ends, respectively. In the unit block UB12, an ultrasonic wave generator 84b2 is installed at a rear-direction end. In the unit block UB13, an ultrasonic wave generator 84b3 is installed at a rear-direction end. In the unit block UB14, an ultrasonic wave generator 84b4 is installed at a rear-direction end. The ultrasonic wave generators 84 can transmit and receive a linear ultrasonic wave US. Specifically, the ultrasonic wave generator 84a transmits an ultrasonic wave US to the ultrasonic wave generators 84b1 to 84b4. In response to the receipt of the ultrasonic wave US from the ultrasonic wave generator 84a, the ultrasonic wave generators 84b1 to 84b4 transmit ultrasonic waves US to the ultrasonic wave generator 84a. An ultrasonic wave US that goes back and forth between the ultrasonic wave generator 84a and the ultrasonic wave generator 84bi is referred to as an ultrasonic wave USi. i is an integer from one to four, and represents the types of ultrasonic waves US1 to US4. Further, $l_{ij}$ (m) is a one-way distance in a case where an ultrasonic wave USi passes through the unit block UB1j (in FIGS. 23, $l_{41}$ to $l_{44}$ as representatives are shown), $v_j$ (m/s) is the speed of an ultrasonic wave US in the unit block UB1j, and $\tau_i$ (s) is a time during which the ultrasonic wave USi goes back and forth. j is an integer from one to four, and represents the types of the unit blocks UB11 to UB14. At this time, the following Math 1 holds from the relationship between the distance, the speed, and the time.

$$\begin{pmatrix} \tau_1 \\ \tau_2 \\ \tau_3 \\ \tau_4 \end{pmatrix} = 2 \begin{pmatrix} l_{11} & l_{12} & l_{13} & l_{14} \\ l_{21} & l_{22} & l_{23} & l_{24} \\ l_{31} & l_{32} & l_{33} & l_{34} \\ l_{41} & l_{42} & l_{43} & l_{44} \end{pmatrix} \begin{pmatrix} \frac{1}{v_1} \\ \frac{1}{v_2} \\ \frac{1}{v_3} \\ \frac{1}{v_4} \end{pmatrix}$$

[Math. 1]

In Math 1, $\tau_i$ can be measured by the ultrasonic wave generator 84a. Further, $l_{ij}$ can be measured from the arrangement of the ultrasonic wave generators 84, and the definition of the unit blocks UB. Therefore, Math 1 is a simultaneous equation for $v_j$. For example, Math 1 is solved by the method of least squares or the like to obtain $v_j$. On the other hand, the speed $v_j$ of an ultrasonic wave US is influenced by the temperature $T_j$ (degC) of the air in the unit block UB1j through which the ultrasonic wave US passes. For example, it is considered that the following Math 2 holds between $v_j$ and $T_j$.

$$v_j = 331.5 + 0.6 \times T_j \quad \text{(Math 2)}$$

Therefore, $v_j$ obtained in Math 1 is substituted for Math 2 to obtain $T_j$. $T_j$ can be defined as the temperature of the unit block UB1j.

For example, similarly to the present embodiment, the temperature distribution estimation apparatus 200 estimates the temperatures of the unit blocks UB whose temperatures are defined, and estimates (interpolates) the temperatures of the surrounding blocks from the estimated temperatures of the unit blocks UB.

(5-7)

Although the embodiments of the present disclosure have been described above, it will be understood that various changes in the forms and details can be made without departing from the spirit and scope of the present disclosure as set forth in the claims.

What is claimed is:

1. A temperature distribution estimation apparatus for estimating a temperature distribution in air of a target space, the temperature distribution estimation apparatus comprising:
    a thermographic camera arranged to capture a thermal image of the target space;
    a camera or death sensor arranged and configured to detect a heat source in the target space;
    a storage; and
    a processor connected to the thermographic camera, the camera or depth sensor, and the storage,
    the processor being configured to use a learning model to estimate the temperature distribution in the air of the target space based on the thermal image, the learning model being trained to input the thermal image and output the temperature distribution,
    the processor being further configured to create a corrected temperature distribution by correcting the temperature distribution to reflect an influence of the heat source on the temperature distribution upon determining that the heat source is present in the target space.

2. The temperature distribution learning apparatus according to claim 1, wherein
    the temperature distribution is a plurality of temperatures at a plurality of points in the air of the target space.

3. The temperature distribution estimation apparatus according to claim 2, further comprising the processor is configured to identify a position of the heat source in the target space based on position data fro the camera or depth sensor, the processor is configured to estimate a temperature variation around the heat source the influence of the heat source.

4. The temperature distribution estimation apparatus according to claim 3, wherein the processor is configured to identify a position of a person as the position of the heat source.

5. The temperature distribution estimation apparatus according to claim 2, wherein the plurality of points correspond to positions of temperature sensors that were used to create the learning model.

6. The temperature distribution estimation apparatus according to claim 5, wherein the processor is configured to generate a temperature map based on the temperature distribution, the temperature map being a grid plane made of a plurality of cells, each of the cells corresponding to one of a plurality of positions in the target space, a subset of the plurality of cells corresponding to the positions of the temperature sensors.

7. The temperature distribution estimation apparatus according to claim 6, wherein the processor is configured to perform interpolation to estimate temperatures in other cells not included in the subset of the cells.

8. The temperature distribution estimation apparatus according to claim 1, wherein the processor is configured to identify a position of the heat source in the target space based on position data from the camera or depth sensor, and the processor is configured to estimate a temperature variation around the heat source as the influence of the heat source.

9. The temperature distribution estimation apparatus according to claim 8, wherein the processor is configured to identify a position of a person as the position of the heat source based on position data from the camera or depth sensor.

10. The temperature distribution estimation apparatus according to claim 1, wherein the camera or depth sensor is configured to output position data indicating a position of a person as the heat source in the target space, the processor is further configured to correct the temperature distribution to reflect an influence of a presence of a same person in the target space upon determining that the same person has stayed in a same position in the target space for a predetermined time.

11. The temperature distribution estimation apparatus according to claim 1, wherein the processor is configured to control an air conditioner based on the temperature distribution or the corrected temperature distribution.

12. The temperature distribution estimation apparatus according to claim 1, wherein the temperature distribution obtained using the learning model does not take into account the influence of the heat source.

13. A temperature distribution estimation method for estimating a temperature distribution including a temperature in air of a target space, the temperature distribution estimation method comprising:

using a thermographic camera to capture a thermal image of the target space;

using a camera or depth sensor to detect a heat source in the target space;

using a processor, which is connected to the thermographic camera and the camera or depth sensor, and a learning model to estimate the temperature distribution in the air of the target space based on the thermal image, the learning model being trained to input the thermal image and output the temperature distribution, and using the processor to create a corrected temperature distribution by correcting the temperature distribution to reflect an influence of the heat source on the temperature distribution upon determining that the heat source is present in the target space.

14. The temperature distribution estimation method according to claim 13, further comprising:

identifying a position of the heat source in the target space; and estimating a temperature variation around the heat source as the influence of the heat source.

* * * * *